US009655160B2

(12) United States Patent
Feuersaenger et al.

(10) Patent No.: US 9,655,160 B2
(45) Date of Patent: May 16, 2017

(54) MAXIMIZATION OF SCHEDULING OPPORTUNITIES IN IN-DEVICE COEXISTENCE INTERFERENCE SCENARIOS

(71) Applicant: Panasonic Intellectual Property Corporation of America, Torrance, CA (US)

(72) Inventors: Martin Feuersaenger, Bremen (DE); Joachim Loehr, Wiesbaden (DE); Prateek Basu-Mallick, Langen (DE); Takashi Tamura, Chuo-ku (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 63 days.

(21) Appl. No.: 14/425,308

(22) PCT Filed: Jul. 22, 2013

(86) PCT No.: PCT/EP2013/065428
§ 371 (c)(1),
(2) Date: Mar. 2, 2015

(87) PCT Pub. No.: WO2014/044436
PCT Pub. Date: Mar. 27, 2014

(65) Prior Publication Data
US 2015/0230286 A1 Aug. 13, 2015

(30) Foreign Application Priority Data
Sep. 18, 2012 (EP) ..................................... 12184833

(51) Int. Cl.
*H04W 4/00* (2009.01)
*H04W 76/04* (2009.01)
(Continued)

(52) U.S. Cl.
CPC ............ *H04W 76/04* (2013.01); *H04B 15/00* (2013.01); *H04L 5/0062* (2013.01);
(Continued)

(58) Field of Classification Search
CPC ..... H04W 76/04; H04W 24/10; H04W 88/08; H04B 15/00
(Continued)

(56) References Cited

U.S. PATENT DOCUMENTS

2009/0312023 A1* 12/2009 Kazmi .............. H04W 36/0088
455/436
2010/0322173 A1 12/2010 Marinier et al.
(Continued)

FOREIGN PATENT DOCUMENTS

WO 2012/095164 A1 7/2012
WO 2012/096527 A2 7/2012

OTHER PUBLICATIONS

Extended European Search Report dated Feb. 21, 2013, for corresponding EP Application No. 12184833.7-1857, 10 pages.
(Continued)

*Primary Examiner* — Farah Faroul
(74) *Attorney, Agent, or Firm* — Seed IP Law Group LLP

(57) ABSTRACT

The invention relates to methods for avoiding in-device coexistence (IDC) interference in a mobile terminal in a mobile communication system, apparatus for performing these methods, and computer readable media instructions to cause the apparatus to perform the methods. In order to avoid IDC interference, an IDC interference indication is reported for at least one of a first cell and a second cell on which an interference condition is detected. In response, an activation/deactivation pattern is received for at least one of the first and second cells for which the interference condition is detected. The activation/deactivation pattern indicates
(Continued)

an off-duration and an offset specifying a time-period during which communication via the at least one of the first and second cells is to be deactivated. According to the activation/deactivation pattern, first and second subframes are determined, at which the communication via the at least one of the first and second cells is to be deactivated and re-activated, respectively.

20 Claims, 23 Drawing Sheets

(51) Int. Cl.
*H04W 72/12* (2009.01)
*H04B 15/00* (2006.01)
*H04W 24/10* (2009.01)
*H04L 5/00* (2006.01)
*H04W 88/08* (2009.01)

(52) U.S. Cl.
CPC ........... *H04L 5/0098* (2013.01); *H04W 24/10* (2013.01); *H04W 72/1215* (2013.01); *H04L 5/001* (2013.01); *H04L 5/0044* (2013.01); *H04W 72/1231* (2013.01); *H04W 76/048* (2013.01); *H04W 88/08* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0312288 A1* | 12/2011 | Fu ........................... | H04B 1/406 455/88 |
| 2012/0069766 A1* | 3/2012 | Fu ........................... | H04B 1/406 370/252 |
| 2012/0082140 A1* | 4/2012 | Lin ................... | H04W 72/1215 370/336 |
| 2012/0207040 A1* | 8/2012 | Comsa .............. | H04W 72/1215 370/252 |
| 2012/0231836 A1 | 9/2012 | Kuo et al. | |
| 2013/0336281 A1 | 12/2013 | Ahn et al. | |
| 2014/0022972 A1* | 1/2014 | Ahn .................. | H04W 36/0072 370/311 |
| 2014/0036870 A1* | 2/2014 | Skov ................. | H04W 36/0088 370/331 |
| 2015/0289141 A1* | 10/2015 | Ghasemzadeh ..... | H04W 72/044 370/330 |
| 2015/0304872 A1* | 10/2015 | Sadek ................... | H04W 24/10 370/252 |

OTHER PUBLICATIONS

International Search Report dated Sep. 16, 2013, for corresponding International Application No. PCT/EP2013/065428, 3 pages.
MediaTek, "Investigation on Applying DRX Mechanism for In-Device Coexistence," R1-105452, 3GPP TSG-RAN WG2 Meeting #71bis, Agenda Item: 7.8, Xi'an, China, Oct. 11-15, 2010, 8 pages.
Notice of Reasons for Rejection dated Feb. 21, 2017, for corresponding JP Application No. 2015-531499, 10 pages.

* cited by examiner

Fig. 9
(Prior Art)

| $C_7$ | $C_6$ | $C_5$ | $C_4$ | $C_3$ | $C_2$ | $C_1$ | R | Oct1

Fig. 22

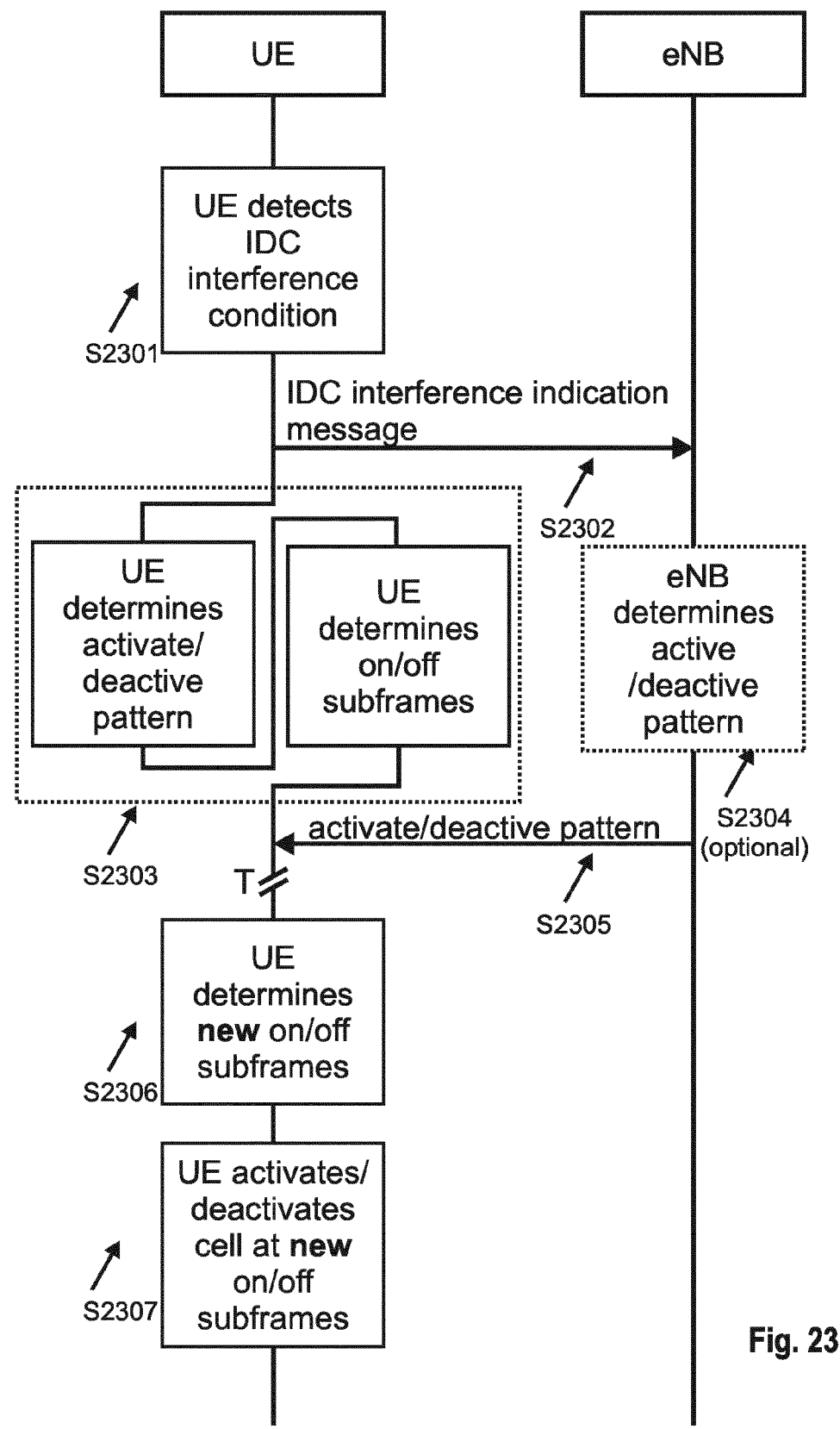

MAXIMIZATION OF SCHEDULING OPPORTUNITIES IN IN-DEVICE COEXISTENCE INTERFERENCE SCENARIOS

FIELD OF THE INVENTION

The invention relates methods for avoiding in-device coexistence, IDC, interference by a mobile terminal in a mobile communication system. The invention is also providing apparatus for performing the methods described herein, as well as computer readable media the instructions of which cause the apparatus and system to perform the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components are described in the following.

Carrier Aggregation in LTE-A for Support of Wider Bandwidth

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1; the logical channels are described between MAC and RLC.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment; the component carrier corresponding to that cell is referred to as the downlink Primary Cell (PCell). There is always one and only one downlink PCell (DL PCell) and one uplink PCell (UL PCell) configured per user equipment in connected state. In the downlink, the carrier corresponding to the PCell is the Downlink Primary Component Carrier (DL PCC), while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The characteristics of the downlink and uplink PCell are:
- For each SCell the usage of uplink resources by the UE in addition to the downlink ones is configurable (the number of DL SCCs configured is therefore always larger or equal to the number of UL SCCs, and no SCell can be configured for usage of uplink resources only)
- The downlink PCell cannot be de-activated, unlike SCells
- Re-establishment is triggered when the downlink PCell experiences Rayleigh fading (RLF), not when downlink SCells experience RLF
- Non-access stratum information is taken from the downlink PCell
- PCell can only be changed with handover procedure (i.e. with security key change and RACH procedure)
- PCell is used for transmission of PUCCH
- The uplink PCell is used for transmission of Layer 1 uplink control information
- From a UE viewpoint, each uplink resource only belongs to one serving cell The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). In other words, while in connected mode, UEs need not acquire broadcast system information directly from the SCells.

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling need only be transmitted once per TTI.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:
  A user identity indicating the user(s) that is/are allocated the resources.
  RB allocation information for indicating the resources (Resource Blocks (RBs)) on which a user(s) is/are allocated. The number of allocated resource blocks can be dynamic.
  The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:
  Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
  Cat 3 information: HARQ related information, e.g. hybrid ARQ process number, redundancy version, retransmission sequence number Downlink & Uplink Data Transmission Regarding downlink data transmission, L1/L2 control signaling is transmitted on a separate physical channel (PDCCH), along with the downlink packet data transmission. This L1/L2 control signaling typically contains information on:
  The physical resource(s) on which the data is transmitted (e.g. subcarriers or subcarrier blocks in case of OFDM, codes in case of CDMA). This information allows the mobile terminal (receiver) to identify the resources on which the data is transmitted.
  The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.
  Hybrid ARQ (HARQ) information:
    HARQ process number: Allows the user equipment to identify the hybrid ARQ process on which the data is mapped.
    Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
    Redundancy and/or constellation version: Tells the user equipment, which hybrid ARQ redundancy version is used (required for de-rate-matching) and/or which modulation constellation version is used (required for demodulation).
  UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g. subcarriers or subcarrier blocks in case of OFDM, codes in case of CDMA).

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
- HARQ Process number: Tells the user equipment from which hybrid ARQ process it should pick the data.
- Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
- Redundancy and/or constellation version: Tells the user equipment, which hybrid ARQ redundancy version to use (required for rate-matching) and/or which modulation constellation version to use (required for modulation).
- UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:

- HARQ process number may not be needed, i.e. is not signaled, in case of a synchronous HARQ protocol.
- A redundancy and/or constellation version may not be needed, and thus not signaled, if Chase Combining is used (always the same redundancy and/or constellation version) or if the sequence of redundancy and/or constellation versions is pre-defined.
- Power control information may be additionally included in the control signaling.
- MIMO related control information, such as e.g. precoding, may be additionally included in the control signaling.
- In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 Chapter 5.7 explains the DRX and is incorporated by reference herein.

The following parameters are available to define the DRX UE behavior; i.e. the On-Duration periods at which the mobile node is active, and the periods where the mobile node is in a DRX mode.

- On duration: duration in downlink sub-frames that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200]
- DRX inactivity timer: duration in downlink sub-frames that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e. not for retransmissions). [1-2560 subframes; 22 steps, 10 spares: 1-6, 8, 10-60, 80, 100-300, 500, 750, 1280, 1920, 2560]
- DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]
- DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]
- DRX short cycle timer: specifies the number of consecutive subframes the UE follows the short DRX cycle after the DRX Inactivity Timer has expired. This parameter is optional. [1-16 subframes]
- Long DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time". The Active Time includes the on-duration of the DRX cycle, the time UE is performing continuous reception while the inactivity timer has not expired and the time UE is performing continuous reception while waiting for a downlink retransmission after one HRQ RTT. Similarly, for the uplink the UE is awake at the subframes where uplink retransmission grants can be received, i.e. every 8 ms after initial uplink transmission until maximum number of retransmissions is reached. Based on the above, the minimum active time is of length equal to on-duration, and the maximum is undefined (infinite).

The operation of DRX gives the mobile terminal the opportunity to deactivate the radio circuits repeatedly (according to the currently active DRX cycle) in order to save power. Whether the UE indeed remains in DRX (i.e. is not active) during the DRX period may be decided by the UE; for example, the UE usually performs inter-frequency measurements which cannot be conducted during the On-Duration, and thus need to be performed some other time, during the DRX opportunity of time, as exemplary illustrated in FIG. 5.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e. only the long DRX cycle is used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to On Duration.

Available DRX values are controlled by the network and start from non-DRX up to x seconds. Value x may be as long as the paging DRX used in RRC_IDLE. Measurement requirements and reporting criteria can differ according to the length of the DRX interval, i.e. long DRX intervals may have more relaxed requirements (for more details see further below). When DRX is configured, periodic CQI reports can only be sent by the UE during "active-time". RRC can further restrict periodic CQI reports so that they are only sent during the on-duration.

In FIG. 6 a per-subframe example of the DRX cycle is shown. The UE checks for scheduling messages (indicated by its C-RNTI, cell radio network temporary identity, on the PDCCH) during the "on duration" period, which is the same for the long DRX cycle and the short DRX cycle. When a scheduling message is received during an "on duration", the UE starts an "inactivity timer" and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behaviour, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

In-Device Coexistence

For ubiquitous network access user equipments (UEs) are equipped with multiple radio transceivers, i.e. LTE, WiFi, and Bluetooth transceivers, and GNSS receivers. One resulting challenge lies in trying to avoid coexistence interference between those collocated radio transceivers. FIG. 7 shows an example of coexistence interference.

Due to extreme proximity of multiple radio transceivers within the same user equipment, the transmit power of one transmitter may be much higher than the received power level of another receiver. Given sufficient frequency separation and appropriate filters the transmit signal may not result in significant interference, but for some scenarios, e.g. different transceivers within the same user equipment operating on adjacent frequencies, current state-of-the-art filter technology might not provide sufficient protection against spurious emission. An illustration of an exemplary problem is shown in FIG. 8.

Coexistence Interference Scenario

Exemplarily shown here are coexistence interference scenarios between LTE radio and other radio technologies concerning the 3GPP frequency bands around the 2.4 GHz ISM band. The band layout is shown in FIG. 9.

LTE Coexisting with WiFi

There are 14 channels in the ISM band (from 2401 MHz to 2495 MHz) used for WiFi operation. Each channel has 5 MHz separation from the adjacent channels (with an exception of channel 14). The number of allowed channels for WiFi varies between countries (mostly 1 to 13 are allowed).

Within LTE band 40 the LTE transmitter will affect the WiFi receiver and vice-versa. As Band 7 is only used for UL communications in LTE, the WiFi receiver will be affected by LTE UL transmitter.

LTE Coexisting with Bluetooth

Bluetooth operates in 79 channels of 1 MHz each in the ISM band between 2402 MHz and 2480 MHz. Similar as WiFi case, the activities of LTE band 40 and BT will disturb each other, and the transmission of LTE in band 7 will affect the BT reception as well.

LTE Coexisting with GNSS

Examples of GNSS include GNSS systems (as GPS, Modernized GPS, Galileo, GLONASS, Space Based Augmentation Systems (SBAS), and Quasi Zenith Satellite System (QZSS)) operate in various frequencies globally with country specific deviations. The problematic cases for collocation of LTE and GNSS include Band 13 (UL: 777-787 MHz)/14 (UL: 788-798 MHz) which can cause interference to L1/E1 frequency of GNSS (1575.42 MHz) as it is close to the second harmonics of band 13/14 (1554-1574 MHz for band 13, 1576-1596 MHz for band 14), Galileo might support 2.5 GHz for GNSS, which will be affected by band 7 LTE and Indian Regional Navigation Satellite System uses IRNSS standard position and restricted services which are transmitted on L5 (1164-1215 MHz) and S (2483.5-2500 MHz) bands, which will be affected by band 7 LTE.

Solutions to In-Device Coexistence (IDC) Problems

Standardization efforts are ongoing in 3GPP, mostly in RAN Working Group 2, and are expected to be reflected in the standard with Release 11. The following section covers the agreements reached in above indicated working group.

The user equipment (UE) judges an LTE frequency as unusable when the ongoing IDC problem on this frequency between collocated LTE and ISM radio cannot be solved by the UE itself.

The assumption is that existing LTE measurements and/or UE internal coordination can be used as a baseline to trigger an indication of a In-device coexistence problem. What exactly triggers the indication is left to UE implementation. It is assumed that the network can trust the UE on the assessment of the IDC problem.

Upon triggering, the user equipment (UE) can send an indication to the network to report the IDC problem(s). It will not be specified when exactly the UE will send this indication. Only ongoing IDC interference on the serving or non-serving frequencies is indicated, this means assumptions or predictions of potential interference is not triggering an IDC problem.

In principal, an eNodeB may respond according to two possible approaches, namely by means of frequency division multiplexing or time division multiplexing reconfiguration of the UE affected by the IDC problem.

For the frequency division multiplexing (FDM) solution the UE will be re-allocated to a LTE frequency band not affected by the ISM interference. Concerning the time division multiplexing (TDM) solution, the LTE Rel-8/9/10 DRX mechanism is considered as a baseline to provide varying time division multiplexing (TDM) patterns (i.e. LTE scheduling and unscheduled periods) for resolving the IDC issues. A DRX based TDM solution should be used in a predictable way, i.e. the eNB should ensure a predictable pattern of unscheduled periods by means of the DRX mechanism.

All necessary/available assistant information for both frequency division multiplexing (FDM) and time division multiplexing (TDM) solutions is sent together to the eNodeB through the IDC indication. In case of an inter-eNB handover, the assistant information is transferred from the source to the target eNodeB.

The IDC indication is conveyed in a new UL-DCCH Message (i.e. RRC signaling) and can also be reused to send the updated assistant information, including the case that there is no longer an IDC problem.

The UE signaling for the IDC problem indication is shown in FIG. 10.

A user equipment (UE) can autonomously deny LTE transmission to protect ISM rare cases if other solutions cannot be used. It is assumed that the UE would deny ISM transmission in order to ensure connectivity with the eNodeB to perform necessary mechanisms to resolve IDC issues.

A prohibit mechanism is used to restrict the interval at which the UE may send IDC indications. It is for further study (FFS) whether the network indicates via dedicated signaling if the UE is allowed to trigger and send an IDC indication. It is also FFS whether the network indicates for which frequencies the UE may trigger an IDC indication and if so, how this information is provided.

Disadvantages of the Prior Art

Previous discussion and solutions for in-device coexistence interference scenarios only focus on a single carrier communication and do not provide solutions for an UE that has aggregated more than one carrier to thereby increase the usable bandwidth.

Currently, when experiencing in-device coexistence problems a UE is provided with two mechanisms for temporarily deactivating the affected carrier(s). The two mechanisms allow the UE to maintain the affected carrier(s) as "aggregated" or "configured" carrier(s) and are, hence, advantageous over the approach of "de-configuring" the affected carrier(s) completely.

The first mechanism includes an UE deactivating the affected carriers for the time during which the in-device coexistence problem persists; the second mechanism includes a UE applying a DRX scheme that solves the IDC problem by configuring the DRX opportunities so as to avoid coexistence interference.

The first mechanism is shown in FIG. 11. A scenario is depicted where the UE aggregates two carriers, namely a first carrier on frequency f1 of a first cell and a second carrier on frequency f2 of a second cell. Exemplary, a case shall be considered in the following where the frequency of the aggregated carrier from the first cell is affected by the IDC problem.

After the UE detects an IDC problem, the eNB is informed by the UE indicating the interference condition. In response thereto, the eNB commands the UE to deactivate the carrier of the first cell. Subsequent to the reception of the deactivation command from the eNB, the UE processes and deactivates the carrier. Processing of a deactivation command may result in a processing delay ($\Delta Tproc$). In response to processing the deactivation command, the UE deactivates the carrier of the first cell After the interference condition has resolved and the UE has notified the eNB thereof, the eNB commands the UE to re-activate the carrier of the first cell. Subsequent to the reception and processing of the re-activation command, the carrier is reactivated again by the UE. Also the processing of the deactivation command may result in a processing delay.

In an exemplary implementation, deactivation and reactivation of the affected carrier(s) is commanded by the eNB to the UE using activation/deactivation mechanism of LTE Rel10. In the case that the activation/deactivation command is included in a medium access control, MAC, control element, the processing delay at the UE may amount to 8 subframes (8 ms).

Turning now to FIG. 12, the second mechanism is shown. Also in this case a scenario is illustrated where the UE aggregates two carriers, namely a first carrier on frequency f1 of the first cell and a second carrier on frequency f2 of the second cell. Exemplary, a case shall be considered in the following where the frequency of the aggregated carrier of the first cell is affected by the IDC problem.

Similar to the previous scenario, in this scenario it is assumed that the UE detects an IDC problem and indicates it to the eNB by reporting an IDC interference indication. Yet, upon notification of the IDC problem, the eNB configures an appropriate DRX scheme, as described in the prior art section. Also in this case, coexistence interference can be avoided.

Nonewithstanding the above, both described mechanisms suffer from drawbacks as will become apparent from the discussion of FIGS. 13 and 14. Specifically, when assuming a short but repetitive type of interference, both mechanisms are disadvantageous in view of lost scheduling opportunities.

In the first mechanism, during the time where the carrier of the first cell is deactivated, scheduling of the UE is not possible. Specifically, the times ($\Delta$Tproc) required for processing of the activation or deactivation commands are exempted from being used for scheduling of the UE on the carrier of the first cell. In this respect, the off-duration ($\Delta$Toff), during which no scheduling of the UE is not possible, amounts to the time between the deactivation command by the eNB and the elapse of the processing delay after the activation command by the eNB.

Further, in case of a short but repetitive type of interference, denoted by the dashed line in FIG. 13, the described mechanism suffers from the drawback of lost scheduling opportunities on the first cell. In other words, scheduling opportunities are lost due to the fact that the eNB leaves knowledge of an exact access pattern of the interfering radio technology out of consideration when signaling the activation/deactivation command to the UE. It may be assumed that the knowledge of the exact pattern of the interfering radio technology is reported to the eNB as part of the IDC interference indication message.

The missed scheduling opportunities result in a loss of throughput for the UE.

Similarly, for the second mechanism illustrated in FIG. 14, the UE is faced with lost scheduling opportunities which result from the specification of the DRX scheme of Rel8/9. Specifically, a DRX scheme may only be configured for all carriers aggregated by an UE solution and does not allow for exceptions of certain carriers of the cells, respectively.

When the DRX scheme is configured for the UE, the DRX opportunities equally apply to the carrier(s) affected by coexistence interference as well as those carrier(s) not affected by coexistence interference. As shown in FIG. 14, not only the carrier of the first cell is deactivated by the UE during the configured DRX opportunity indicated as off-duration ($\Delta$Toff) but also the carrier of the second cell is deactivated by the UE during the same configured DRX opportunity.

Further, the eNB may only utilize the existing scheduling opportunities (i.e. excluding the off-duration) for both, the affected and the unaffected carriers. Hence, also in this case scheduling opportunities are lost, as denoted by the dashed line in FIG. 14, on the unaffected carriers and throughput is degraded.

Turning back to the first mechanism previously discussed where the eNB signals an activation and deactivation command to avoid in-device coexistence interference. Extending this mechanism to reduce losses of scheduling opportunities, the eNB could potentially make use of the additional knowledge of the exact access pattern of the interfering radio technology reported as part of the IDC interference indication message.

Specifically, the eNB could be adapted to signal a deactivation command for time periods when interference for communication on the affected carrier(s) is to be expected, and by signaling an activation command for time periods where no interference for communication on the affected carrier(s) is to be expected. In other words, the eNB could activate and deactivate the affected carrier(s) based on the LTE-on/LTE-off pattern that was suggested by the UE in the IDC interference indication or based on an adaptation of this pattern that the eNB considers suitable.

However, also this extended mechanism would suffer from severe drawbacks and seems far from optimal for achieving a maximization of the scheduling opportunities in-device coexistence interference scenarios. A potential implementation of this extended mechanism and the resulting drawbacks are illustrated for the above discussed IDC interference condition scenario in FIG. 15.

On one hand, the extended mechanism requires control by the eNB to command the UE to activate and deactivate communications on the affected carrier(s). Every deactivation and subsequent re-activation of communication by the UE on the affected carrier(s) requires transmission of two commands, namely a respective activation and deactivation command.

Consequently, the extended mechanism would result in an increase of a required control bandwidth as it would rely on an extensive use of signaling messages, e.g. MAC control elements.

On the other hand, existent implementations of activation/deactivation commands require a processing time delay ($\Delta$Tproc) at the UE. The eNB cannot rely on an instantaneous activation/deactivation of communication on the affected carrier(s). Moreover, the eNB has to consider network delays and according guard times before the eNB can expect the UE to have applied the activation/deactivation command and can schedule the UE by the eNB is possible. Network delays may result from possible retransmissions of the activation/deactivation command; the eNB does not know in advance the exact point in time where the carrier is activated or deactivated by the UE.

In case of an implementation where MAC control elements are used by the eNB as activation/deactivation commands, the network prescribes an eight subframe delay/guard time ($\Delta$Tproc=8 subframes) between the reception of the MAC CE commanding the activation/deactivation and the actual activation or deactivation of communication on the affected cell(s).

Consequently, the processing delay of the transmitted activation/deactivation command theoretically limits the shortness of the opportunity of scheduling the UE on the affected carrier(s) by the eNB such that it can never be less than twice the processing time ($\Delta$Ton$\geq$2*$\Delta$Tproc). In this respect, when trying to maximize scheduling opportunities, short activation periods cannot be realized by this extended mechanism. Even for slightly longer activation periods, the advantage of a scheduling opportunity ($\Delta$Ton) is unduly reduced or trimmed by a preceding processing delay ($\Delta$Tproc) and a succeeding processing delay ($\Delta$Tproc) may be negligible as illustrated in FIG. 15.

SUMMARY OF THE INVENTION

The present invention strives to avoid the various disadvantages mentioned above.

One object of the invention is to propose an improved in-device coexistence interference avoiding mechanism for a mobile terminal that has aggregated more than one carrier in order to maximize scheduling opportunities. In the invention, according to another objection, an improved in-device interference avoiding mechanism for a mobile terminal is suggested that reduces the signaling overhead in transmitting an activation/deactivation pattern.

At least one of the above objects is solved by the subject matter of the independent claims. Advantageous embodiments are subject to the dependent claims.

According to a first aspect, the invention suggests an improved in-device coexistence interference avoiding mechanism that differentiates between affected and non-affected carrier(s), which a mobile terminal has aggregated, and uses an IDC interference indication for configuring an activation/deactivation pattern for the affected carrier(s). Configuring a mobile terminal with the activation/deactivation pattern allows the mobile terminal to autonomously deactivate and re-activate communication via the affected carriers at subframes avoiding the access pattern of an interfering radio technology.

The IDC interference indication message exemplary includes information on the interfering radio technology and an access pattern of that interfering radio technology. In this respect, the IDC interference indication message may directly be used for determining an activation/deactivation pattern for the mobile terminal.

However, as becomes apparent from the mechanisms discussed in the technical background section of this document, present approaches have focused on a control by the base station and thus were disadvantageous with respect to the signaling overhead and the maximization of the scheduling opportunities.

In contrast, it is the approach of the invention to provide the mobile terminal and not the base station with sufficient information such that the mobile terminal is enabled to autonomously perform deactivation and re-activation of communication via the affected carrier(s). Accordingly, the deactivation and re-activation of affected carrier(s) by the mobile terminal does not require transmission of separate activation and deactivation commands and is not delayed due to the processing of the commands by the mobile terminal.

The invention provides for a method for avoiding in-device coexistence, IDC, interference by a mobile terminal in a mobile communication system. The mobile terminal is in communication with an aggregation access point via a first cell and a second cell and is in communication with a wireless communication device. In this method, the mobile terminal detects an interference condition between the communication with the aggregation access point via one of the first or second cell and the communication with the wireless communication device. Then, the mobile terminal reports, to the aggregation access point, an IDC interference indication for the one of the first or second cell on which the interference condition is detected. The mobile terminal then receives, from the aggregation access point, an activation/deactivation pattern for the one of the first or second cell for which the IDC interference indication is reported, the activation/deactivation pattern indicating an off-duration and an offset specifying a time-period during which communication via the one of the first or second cell is to be deactivated.

Based on the off-duration and the offset indicated in the received activation/deactivation pattern the mobile terminal determines a first subframe from which on communication via the one of the first or second cell is to be deactivated and a second subframe, succeeding the first subframe, from which on communication via the one of the first or second cell is to be re-activated. The mobile terminal thereafter deactivates and re-activates the one of the first or second cell at the determined first and second subframe, respectively, for avoiding IDC interference between communication with the aggregation access point and communication with the wireless communication device.

According to an advantageous embodiment of the invention which can be used in addition or alternatively to the above, the activation/deactivation pattern additionally includes an ID of the one of the first or second cell, and optionally IDs of other cells, indicating the cells for which the determining step and the deactivation and re-activation step is to be performed.

According to an advantageous embodiment of the invention which can be used in addition or alternatively to the above, the activation/deactivation pattern additionally indicates an on-duration which together with the off-duration and the offset specifies a time-period during which communication via the one of the first or second cell is to be re-activated. Based on the on-duration, the off-duration and the offset indicated in the received activation/deactivation pattern, the mobile terminal determines further subframes, succeeding the second subframe, from which on communication via the one of the first and second cell is alternatively deactivated and re-activated. Then, the mobile terminal subsequently deactivates and re-activates the one of the first or second cell alternatively at the determined further subframes.

According to an advantageous embodiment of the invention which can be used in addition or alternatively to the above, in case the mobile terminal receives, from the aggregation access point, a medium access control, MAC, control element, ordering an activation/deactivation for the one of the first or second cell after the mobile terminal has received the activation/deactivation pattern and after it has determined the first and second subframes for the one of the first or second cell, the mobile terminal ignores the MAC control element ordering the activation/deactivation and the mobile terminal performs deactivation and re-activation at the determined first and second subframe, respectively.

According to an advantageous embodiment of the invention which can be used in addition or alternatively to the above, in case the mobile terminal receives, from the aggregation access point, a medium access control, MAC, control element, ordering a deactivation of the one of the first or second cell, the mobile terminal deactivates communication via the one of the first or second cell after processing the received MAC control element, and the mobile terminal the at least one deactivation and re-activation of communication is only performed at the determined subframes for the one of the first or second cell after the mobile terminal has received, from the aggregation access point, and after the mobile terminal has processed another MAC control element ordering the activation of the one of the first or second cell.

According to an advantageous embodiment of the invention which can be used in addition or alternatively to the above, in case the activation/deactivation pattern additionally indicates an on-duration, and in case the processing by the mobile terminal of the other received MAC control element, ordering the activation of the one of the first or second cell, is completed at a time for which the received activation/deactivation pattern specifies that communication via the one of the first or second cell is to be re-activated, the mobile terminal additionally activates communication via the one of the first or second cell is performed by the mobile terminal after completion of the processing of the other MAC control element.

According to an advantageous embodiment of the invention which can be used in addition or alternatively to the above, the mobile terminal triggers a power headroom report, PHR, prior to the re-activation of the one of the first or second cell at the determined second subframe.

According to an advantageous embodiment of the invention which can be used in addition or alternatively to the above, in case the mobile terminal receives, from the aggregation access point, a reconfigured activation/deactivation pattern which is not for the one of the first or second cell for which the activation/deactivation pattern is previously received, the reconfigured activation/deactivation pattern triggers reconfiguration by the mobile terminal of the deactivating and re-activating step by excluding the one of the first or second cell from being deactivated and re-activated at the determined first and second subframe, respectively.

According to an advantageous embodiment of the invention which can be used in addition or alternatively to the above, the activation/deactivation pattern is signalled from the aggregation access point to the mobile terminal as a radio resource control, RRC, message.

According to an advantageous embodiment of the invention which can be used in addition or alternatively to the above, the offset indicated in the received activation/deactivation pattern is based on the reported IDC interference condition.

According to an advantageous embodiment of the invention which can be used in addition or alternatively to the above, the IDC interference indication includes a desired time division multiplex, TDM, pattern indicating a periodicity of the TDM pattern and a scheduling period or an unscheduled period.

According to an advantageous embodiment of the invention which can be used in addition or alternatively to the above, wherein the mobile terminal deactivates the one of the first or second cell including: stopping transmission of SRS, stopping reporting of CQI/PMI/RI/PTI, stopping UL-SCH transmissions and stopping monitoring of PDCCH.

According to an advantageous embodiment of the invention which can be used in addition or alternatively to the above, the aggregation access point receives, from the mobile terminal, an IDC interference indication for the one of the first or second cell on which the interference condition is detected by the mobile terminal. Based on the received IDC interference indication, the aggregation access point determines an activation/deactivation pattern for the mobile terminal, the activation/deactivation pattern indicating an off-duration and an offset specifying a time-period during which communication by the mobile terminal via the one of the first or second cell is to be deactivated. Then, the aggregation access point reports the determined activation/deactivation pattern to the mobile terminal.

The invention additionally provides for a method for avoiding in-device coexistence, IDC, interference by a mobile terminal in a mobile communication system. The mobile terminal is in communication with an aggregation access point via a first cell and a second cell, and is in communication with a wireless communication device. In this method, the mobile terminal detects an interference condition between the communication with the aggregation access point via one of the first or second cell and the communication with the wireless communication device. Then, the mobile terminal reports an IDC interference indication for the one of the first or second cell on which the interference condition is detected, the IDC interference indication including a desired activation/deactivation pattern for the one of the first or second cell indicating an off-duration and an offset specifying a time-period during which communication via the one of the first or second cell is to be deactivated. Based on the off-duration and the offset indicated in the desired activation/deactivation pattern, the mobile terminal determines a first subframe from which on communication via the one of the first or second cell is to be deactivated and a second subframe, succeeding the first subframe, from which on communication via the one of the first or second cell is to be re-activated. Then, the mobile terminal deactivates and re-activates the one of the first or second cell at the determined first and second subframe, respectively, for avoiding IDC interference between communication with the aggregation access point and communication with the wireless communication device.

According to an advantageous embodiment of the invention which can be used in addition or alternatively to the above, the mobile terminal only deactivates and re-activates communication for the one of the first or second cell on which the interference condition is detected, after elapse of a predetermined time-duration starting from the step of reporting the IDC interference indication.

According to an advantageous embodiment of the invention which can be used in addition or alternatively to the above, the mobile terminal does not deactivate and re-activate communication, in case the mobile terminal receives a medium access control, MAC, control element including the R-bit equal one prior to the elapse of the predetermined time-duration.

According to an advantageous embodiment of the invention which can be used in addition or alternatively to the above, the mobile terminal receives another activation/deactivation pattern for the one of the first or second cell for which the IDC interference indication is reported, the activation/deactivation pattern indicating another off-duration and another offset specifying another time-period during which communication via the one of the first or second cell is to be deactivated. In case the mobile terminal receives the other activation/deactivation pattern prior to the elapse of the predetermined time-duration, the mobile terminal determines, based on the other off-duration and the other offset indicated in the received other activation/deactivation pattern, the first and second subframe and the mobile terminal performs deactivation and the re-activation using the first and second subframe.

The invention further provides for a mobile terminal for avoiding in-device coexistence, IDC, interference in a mobile communication system, the mobile terminal being in communication with an aggregation access point via a first cell and a second cell, the mobile terminal additionally being in communication with a wireless communication device, the method comprising the steps. A processor of the mobile terminal is configured to detect an interference condition between the communication with the aggregation access point via one of the first or second cell and the communication with the wireless communication device A transmitting circuit of the mobile terminal is configured to report, to the aggregation access point, an IDC interference indication for the one of the first or second cell on which the interference condition is detected. A receiving circuit of the mobile terminal is configured to receive, from the aggregation access point, an activation/deactivation pattern for the one of the first or second cell for which the IDC interference indication is reported, the activation/deactivation pattern indicating an off-duration and an offset specifying a time-period during which communication via the one of the first or second cell is to be deactivated. The processor of the mobile terminal is further configured to determine, based on the off-duration and the offset indicated in the received activation/deactivation pattern, a first subframe from which on communication via the one of the first or second cell is to be deactivated and a second subframe, succeeding the first subframe, from which on communication via the one of the first or second cell is to be re-activated. The processor of the mobile terminal is additionally configured to deactivate and re-activate the one of the first or second cell at the determined first and second subframe, respectively, for avoiding IDC interference between communication with the aggregation access point and communication with the wireless communication device.

According to an advantageous embodiment of the invention which can be used in addition or alternatively to the above, activation/deactivation pattern additionally includes an ID of the one of the first or second cell, and optionally IDs of other cells, indicating the cells for which the processor of the mobile terminal is configured to determine the first and second subframe and is further configured to deactivate and re-activate communication at the determined first and second subframe.

According to an advantageous embodiment of the invention which can be used in addition or alternatively to the above, the activation/deactivation pattern additionally indicates an on-duration which together with the off-duration and the offset specifies a time-period during which communication via the one of the first or second cell is to be re-activated. Based on the on-duration, the off-duration and the offset indicated in the received activation/deactivation pattern further subframes, the processor of the mobile terminal is additionally configured to determine succeeding the second subframe, from which on communication via the one of the first and second cell is alternatively deactivated and re-activated. The processor of the mobile terminal is additionally configured to deactivate and re-activate the one of the first or second cell alternatively at the determined further subframes.

According to an advantageous embodiment of the invention which can be used in addition or alternatively to the above, in case the receiving circuit of the mobile terminal receives, from the aggregation access point, a medium access control, MAC, control element, ordering an activation/deactivation for the one of the first or second cell after having received the activation/deactivation pattern and after the processor of the mobile terminal has determined the first and second subframes for the one of the first or second cell, the receiving circuit and the processor of the mobile terminal are additionally configured to ignore the MAC control element ordering the activation/deactivation and to perform the deactivation and re-activation at the determined first and second subframe, respectively.

According to an advantageous embodiment of the invention which can be used in addition or alternatively to the above, in case the receiving circuit of the mobile terminal receives, from the aggregation access point, of a medium access control, MAC, control element, ordering a deactivation of the one of the first or second cell, the processor of the mobile terminal is additionally configured to deactivate the communication via the one of the first or second cell after processing the received MAC control element, and the processor of the mobile terminal is additionally configured to only deactivate and re-activate communication at the determined subframes for the one of the first or second cell after the receiving circuit of the mobile terminal receives, from the aggregation access point, and after the processor of the mobile terminal processes another MAC control element ordering the activation of the one of the first or second cell.

According to an advantageous embodiment of the invention which can be used in addition or alternatively to the above, in case the activation/deactivation pattern additionally indicates an on-duration, and in case processing, by the processor of the mobile terminal, of the other by the receiving circuit received MAC control element, ordering the activation of the one of the first or second cell, is completed at a time for which the by the receiving circuit received activation/deactivation pattern specifies that communication via the one of the first or second cell is to be re-activated, the processor of the mobile terminal is additionally configured to activate communication via the one of the first or second cell after completion of the processing of the other MAC control element.

According to an advantageous embodiment of the invention which can be used in addition or alternatively to the above, the processor of the mobile terminal is further configured to triggering a power headroom report, PHR, prior to the re-activation of the one of the first or second cell at the determined second subframe.

According to an advantageous embodiment of the invention which can be used in addition or alternatively to the above, in case the receiving circuit of the mobile terminal receives, from the aggregation access point, a reconfigured activation/deactivation pattern which is not for the one of the first or second cell for which the activation/deactivation pattern is previously received, the processor of the mobile terminal is additionally configured to trigger, based on the received reconfigured activation/deactivation pattern, reconfiguration of the deactivation and re-activation of communication by excluding the one of the first or second cell from being deactivated and re-activated at the determined first and second subframe, respectively.

According to an advantageous embodiment of the invention which can be used in addition or alternatively to the above, the activation/deactivation pattern is signalled from the aggregation access point to the mobile terminal as a radio resource control, RRC, message.

According to an advantageous embodiment of the invention which can be used in addition or alternatively to the above, the offset indicated in the received activation/deactivation pattern is based on the reported IDC interference condition.

According to an advantageous embodiment of the invention which can be used in addition or alternatively to the above, the IDC interference indication includes a desired time division multiplex, TDM, pattern indicating a periodicity of the TDM pattern and a scheduling period or an unscheduled period.

According to an advantageous embodiment of the invention which can be used in addition or alternatively to the above, the processor of the mobile terminal is additionally configured to deactivate the one of the first or second cell includes stopping transmission of SRS, stopping reporting of CQI/PMI/RI/PTI, stopping UL-SCH transmissions and stopping monitoring of PDCCH.

The invention also provides for a mobile terminal for avoiding in-device coexistence, IDC, interference in a mobile communication system The mobile terminal is in communication with an aggregation access point via a first cell and a second cell, and is in communication with a wireless communication device. A processor of the mobile terminal is configured to detect an interference condition between the communication with the aggregation access point via one of the first or second cell and the communication with the wireless communication device. A transmitting circuit of the mobile terminal is configured to report an IDC interference indication for the one of the first or second cell on which the interference condition is detected, the IDC interference indication including a desired activation/deactivation pattern for the one of the first or second cell indicating an off-duration and an offset specifying a time-period during which communication via the one of the first or second cell is to be deactivated. The processor of the mobile terminal is further configured to determine, based on the off-duration and the offset indicated in the desired activation/deactivation pattern, a first subframe from which on communication via the one of the first or second cell is to be deactivated and a second subframe, succeeding the first subframe, from which on communication via the one of the first or second cell is to be re-activated. The processor of the mobile terminal is additionally configure to deactivate and re-activate the one of the first or second cell at the determined first and second subframe, respectively, for avoiding IDC interference between communication with the aggregation access point and communication with the wireless communication device.

According to an advantageous embodiment of the invention which can be used in addition or alternatively to the above, the processor of the mobile terminal is configured to deactivate and re-activating step are only performed for the one of the first or second cell on which the interference condition is detected, after elapse of a predetermined time-duration starting from the step of reporting the IDC interference indication.

According to an advantageous embodiment of the invention which can be used in addition or alternatively to the above, the processor of the mobile terminal is configured not to perform deactivating and re-activating communication, in case of a reception of a medium access control, MAC, control element including the R-bit equal one prior to the elapse of the predetermined time-duration.

According to an advantageous embodiment of the invention which can be used in addition or alternatively to the above, the receiving circuit of the mobile terminal is further configured to receive another activation/deactivation pattern for the one of the first or second cell for which the IDC interference indication is reported, the activation/deactivation pattern indicating another off-duration and another offset specifying another time-period during which communication via the one of the first or second cell is to be deactivate. In case the receiving circuit of the mobile terminal receives the other activation/deactivation pattern prior to the elapse of the predetermined time-duration, the processor of the mobile terminal is additionally configured to determine, based on the other off-duration and the other offset indicated in the received other activation/deactivation pattern, the first and second subframe and the processor of the mobile terminal is additionally configured to deactivate and to re-activate communication using the first and second subframe.

The invention further provides for an aggregation access point for assisting a mobile terminal to avoid in-device coexistence, IDC, interference in a mobile communication system. The aggregation access point is in communication with to mobile terminal via a first cell and a second cell. A receiving circuit of the aggregation access point is configured to receive, from the mobile terminal, an IDC interference indication for one of the first or second cell on which an interference condition is detected by the mobile terminal. A processor of the aggregation access point is configured to determine, based on the received IDC interference indication, an activation/deactivation pattern for the mobile terminal, the activation/deactivation pattern indicating an off-duration and an offset specifying a time-period during which communication by the mobile terminal via the one of the first or second cell is to be deactivated. A transmitting circuit of the aggregation access point is configured to report the determined activation/deactivation pattern to the mobile terminal.

According to an advantageous embodiment of the invention which can be used in addition or alternatively to the above, mobile terminal corresponds to the mobile terminal previously described.

The invention even further provides for a computer readable medium storing instructions that, when executed by a processor of a mobile terminal, cause the mobile terminal to avoiding in-device coexistence, IDC, interference, the mobile terminal being in communication with an aggregation access point via a first cell and a second cell, the mobile terminal additionally being in communication with a wireless communication device, by: detecting an interference condition between the communication with the aggregation access point via one of the first or second cell and the communication with the wireless communication device; reporting, to the aggregation access point, an IDC interference indication for the one of the first or second cell on which the interference condition is detected; receiving, from the aggregation access point, an activation/deactivation pattern for the one of the first or second cell for which the IDC interference indication is reported, the activation/deactivation pattern indicating an off-duration and an offset specifying a time-period during which communication via the one of the first or second cell is to be deactivated; determining, based on the off-duration and the offset indicated in the received activation/deactivation pattern, a first subframe from which on communication via the one of the first or second cell is to be deactivated and a second subframe, succeeding the first subframe, from which on communication via the one of the first or second cell is to be re-activated; and deactivating and re-activating the one of the first or second cell at the determined first and second subframe, respectively, for avoiding IDC interference between communication with the aggregation access point and communication with the wireless communication device.

The invention additionally provides for a computer readable medium storing instructions that, when executed by a processor of a mobile terminal, cause the mobile terminal to avoiding in-device coexistence, IDC, interference, the mobile terminal being in communication with an aggregation access point via a first cell and a second cell, the mobile terminal additionally being in communication with a wireless communication device, by: detecting an interference condition between the communication with the aggregation access point via one of the first or second cell and the communication with the wireless communication device; reporting an IDC interference indication for the one of the first or second cell on which the interference condition is detected, the IDC interference indication including a desired activation/deactivation pattern for the one of the first or second cell indicating an off-duration and an offset specifying a time-period during which communication via the one of the first or second cell is to be deactivated; determining, based on the off-duration and the offset indicated in the desired activation/deactivation pattern, a first subframe from which on communication via the one of the first or second cell is to be deactivated and a second subframe, succeeding the first subframe, from which on communication via the one of the first or second cell is to be re-activated; and deactivating and re-activating the one of the first or second cell at the determined first and second subframe, respectively, for avoiding IDC interference between communication with the aggregation access point and communication with the wireless communication device.

The computer readable medium according to a further embodiment of the invention is storing instructions that, when executed by a processor of a mobile terminal, cause the mobile terminal to perform the steps of the method for avoiding in-device coexistence, IDC, interference, according to one of the various exemplary embodiments described herein.

The invention also provides for a computer readable medium storing instructions that, when executed by a processor of a aggregation access point, cause the aggregation access point to assist a mobile terminal to avoid in-device coexistence, IDC, interference in a mobile communication system, the aggregation access point being in communication with to mobile terminal via a first cell and a second cell, by: receiving, from the mobile terminal, an IDC interference indication for one of the first or second cell on which an interference condition is detected by the mobile terminal; determining, based on the received IDC interference indication, an activation/deactivation pattern for the mobile terminal, the activation/deactivation pattern indicating an off-duration and an offset specifying a time-period during which communication by the mobile terminal via the one of the first or second cell is to be deactivated; a transmitting circuit configured to report the determined activation/deactivation pattern to the mobile terminal.

BRIEF DESCRIPTION OF THE FIGURES

In the following the invention is described in more detail in reference to the attached figures and drawings. Similar or corresponding details in the figures are marked with the same reference numerals.

Figure 9:
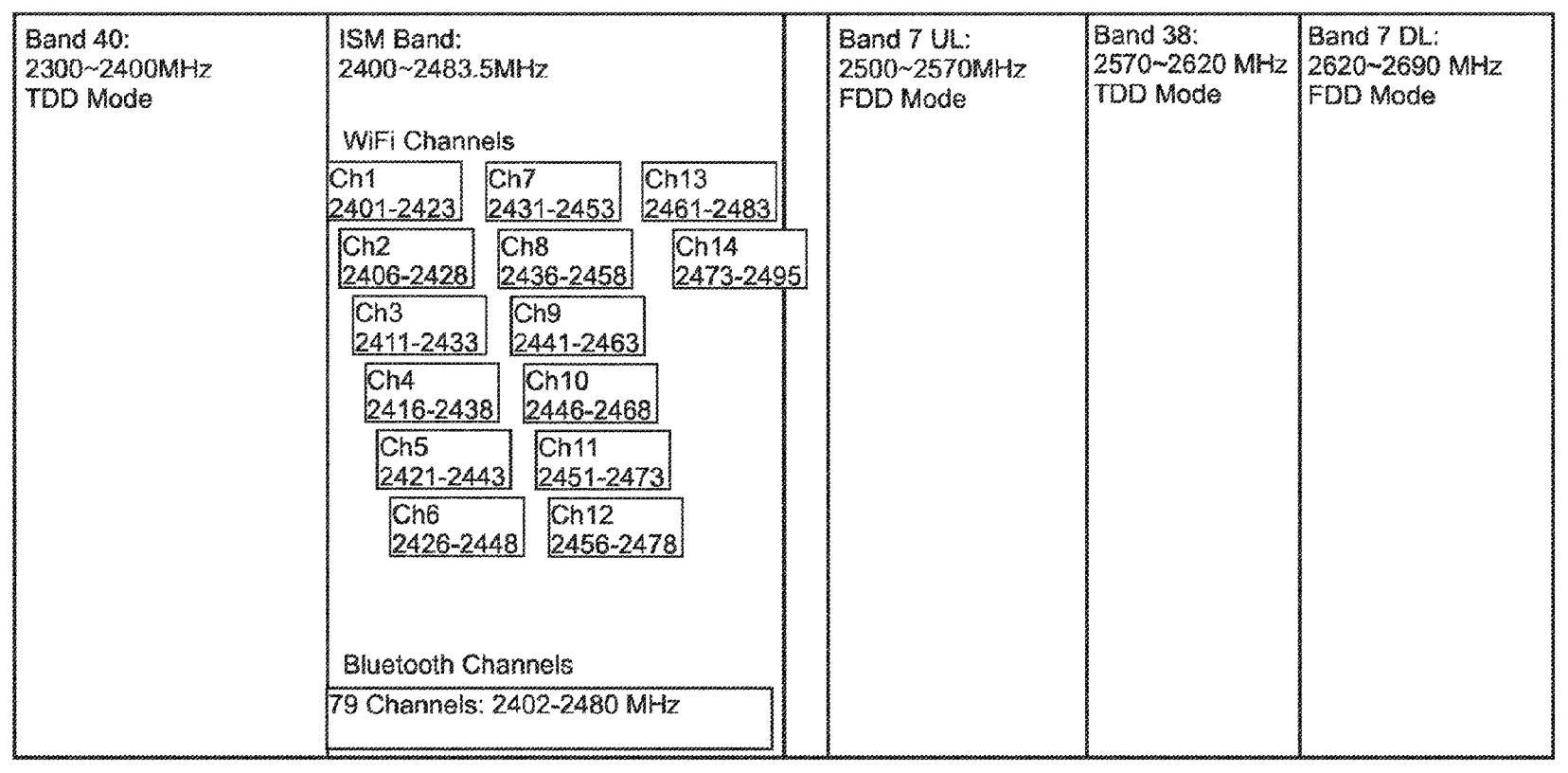

FIG. 9 shows examples of co-location of 3GPP frequency bands and ISM frequency bands, and the usage thereof for specific communication technologies, FIG. 22 shows an activation/deactivation MAC control element where the last bit (R-bit) indicates a network objection for use with the second embodiment of the invention, and FIG. 23 shows a sequence diagram of another improved in-device coexistence interference avoiding mechanism to be performed by a user equipment (UE) including transmission of an updated activation/deactivation pattern according to the second embodiment of the invention.

DETAILED DESCRIPTION OF THE INVENTION

Figure 1:
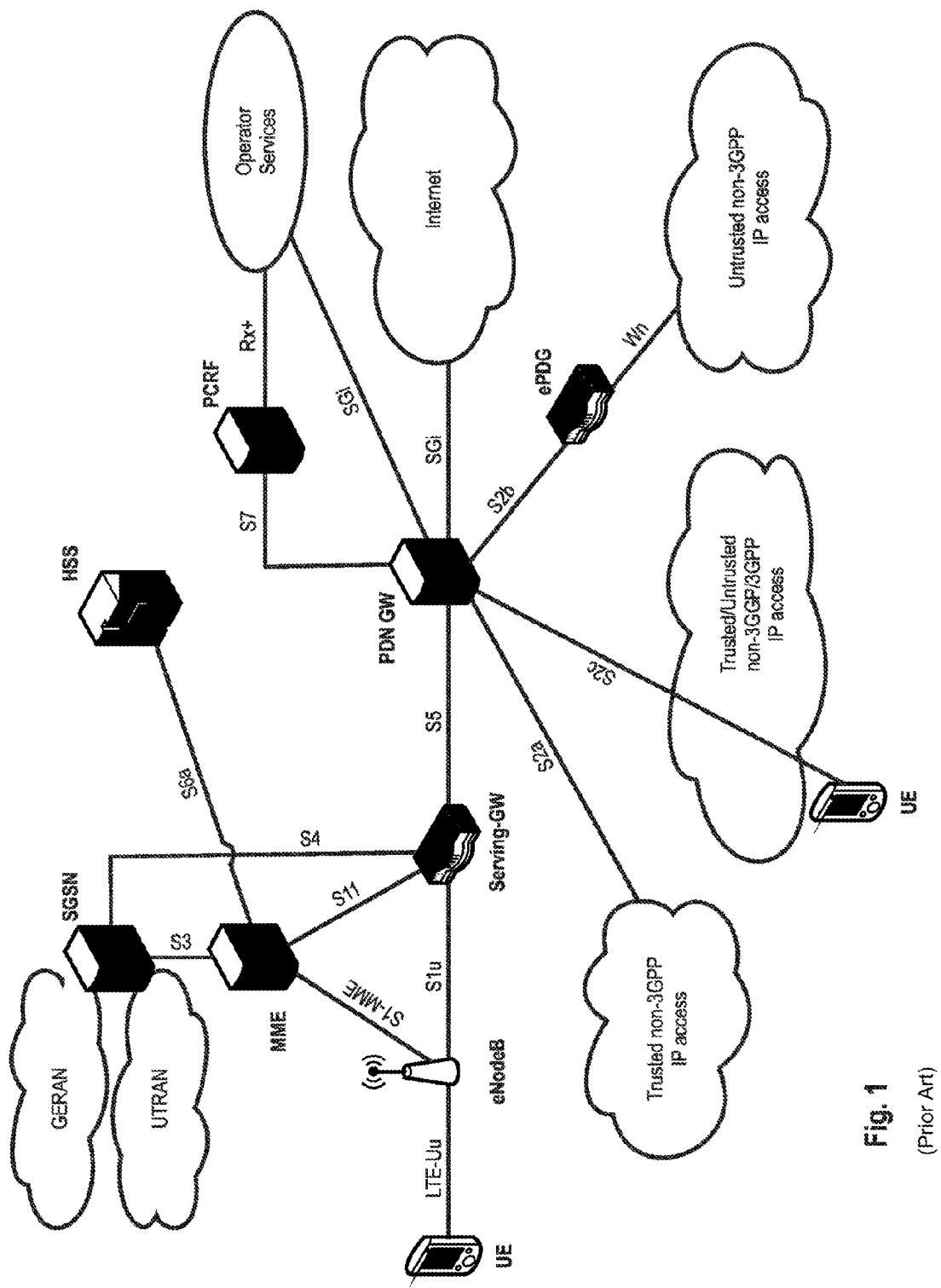
FIG. 1 shows an exemplary architecture of a 3GPP LTE system.
Figure 2:
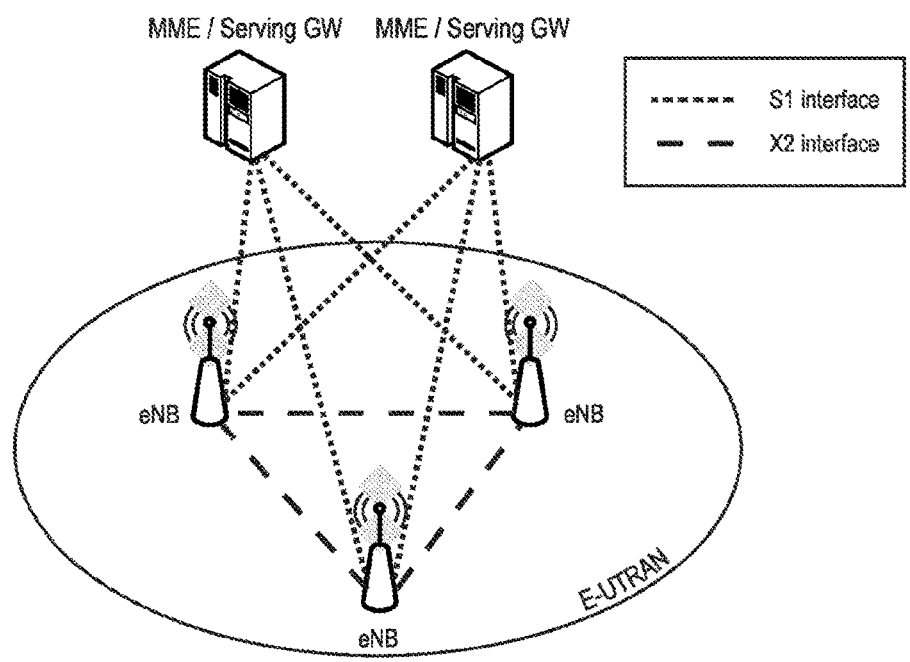
FIG. 2 shows an exemplary overview of the overall E-UTRAN architecture of 3GPP LTE.
Figure 3:
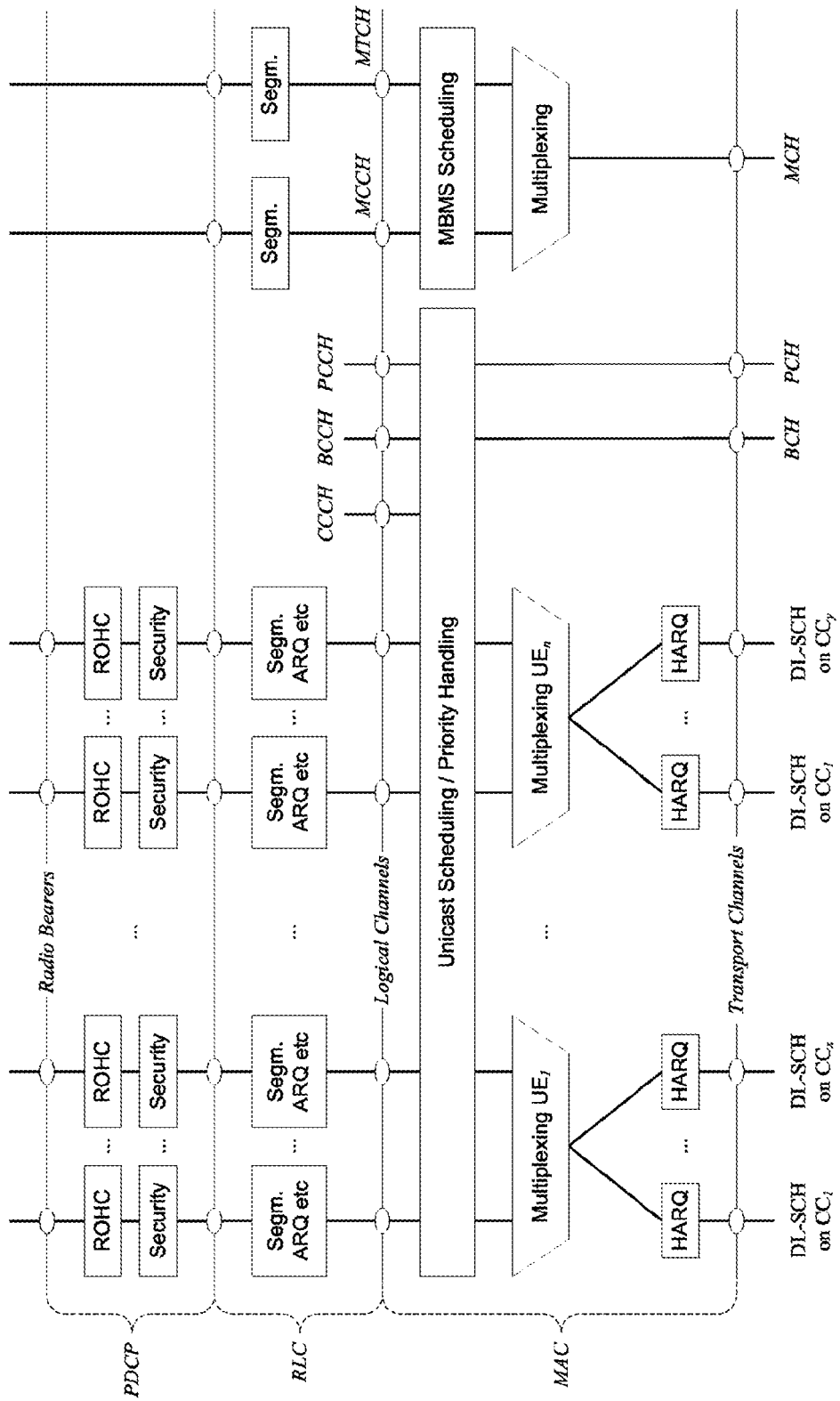
FIGS. 3 & 4 show the 3GPP LTE-A (Release 10) Layer 2 structure with activated carrier aggregation for the downlink and uplink, respectively.
Figure 4:
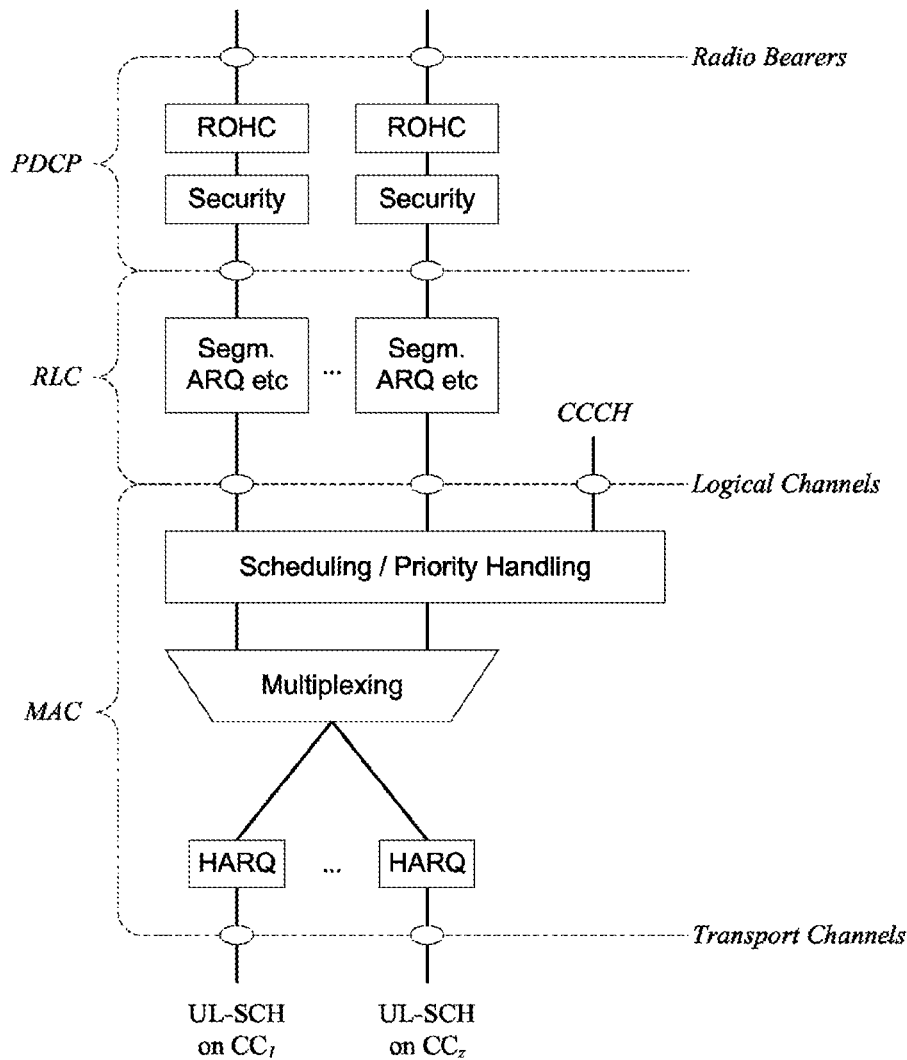
Figure 5:
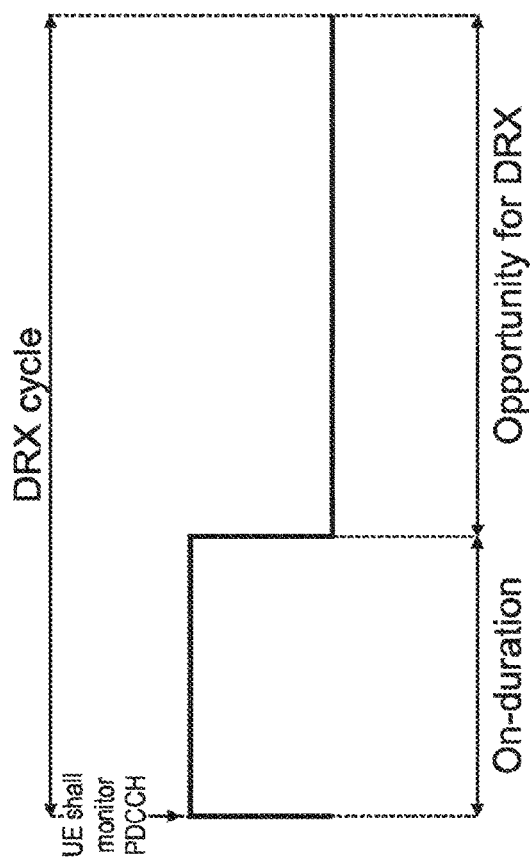
FIGS. 5 & 6 show a DRX cycle and an according two-level DRX procedure of 3GPP LTE.
Figure 6:
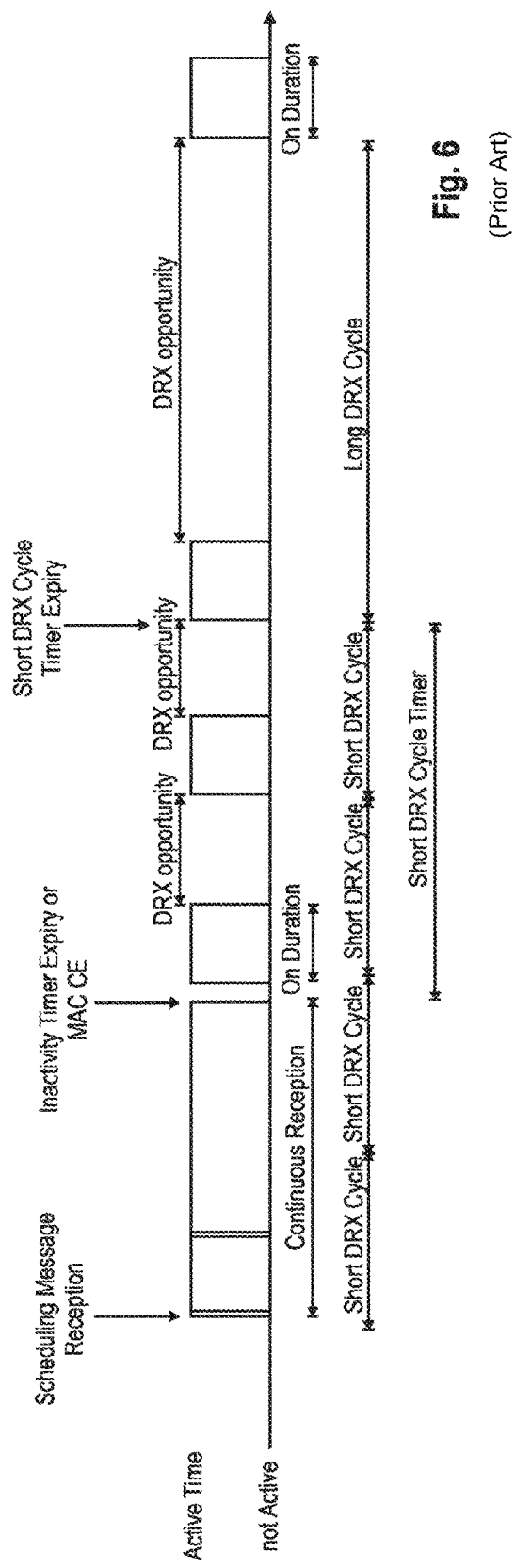
Figure 7:
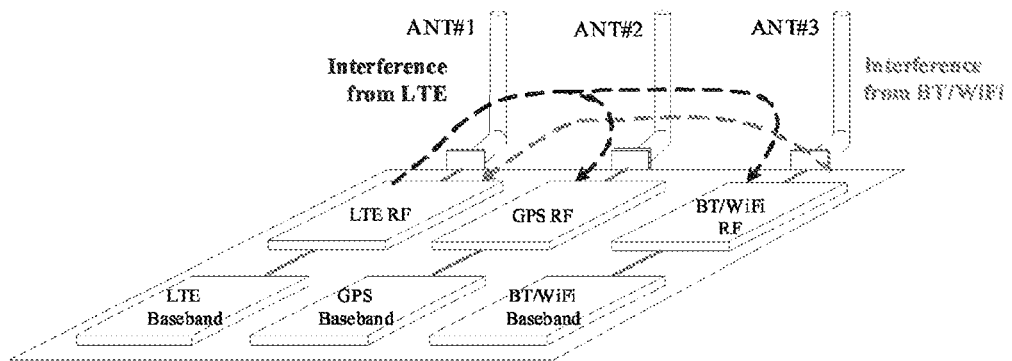
FIG. 7 shows examples of coexistence interference between coexisting transceivers of an user equipment (UE), FIG. 8 exemplary illustrates coexistence interference between an in-device ISM transmitter and an E-UTRA receiver.
Figure 8:
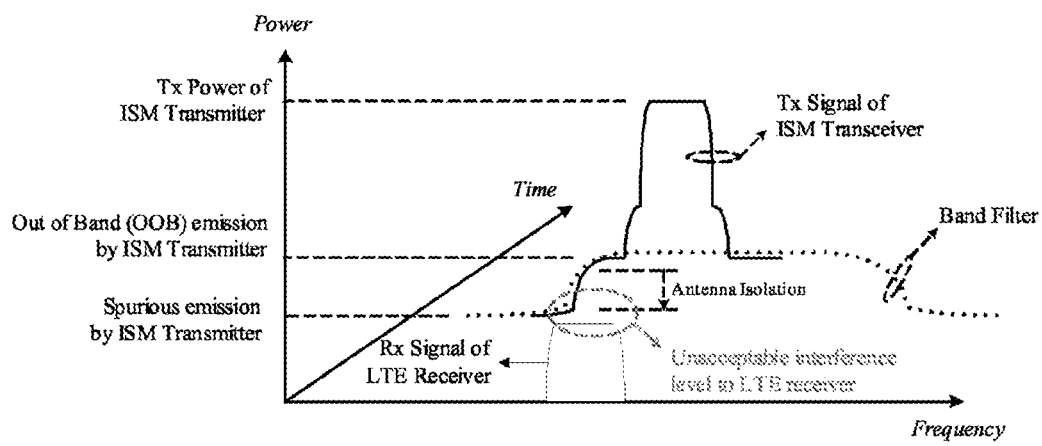
Figure 10:
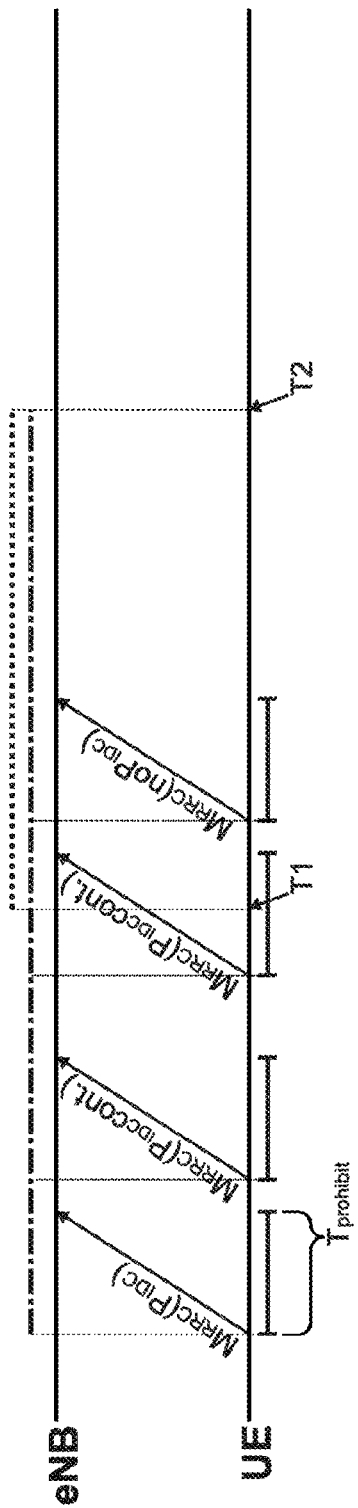
FIG. 10 illustrates an exemplary signaling diagram for use in an in-device coexistence scenario as defined in 3GPP LTE (Release 10), FIG. 11 exemplifies application of an activation/deactivation mechanism to a carrier aggregated by a mobile terminal for avoiding Rel11 in-device coexistence interference according to a TDM solution, FIG. 12 exemplifies application of a DRX mechanism of a mobile terminal for avoiding REL 11 in-device coexistence interference according to a TDM solution.
Figure 11:
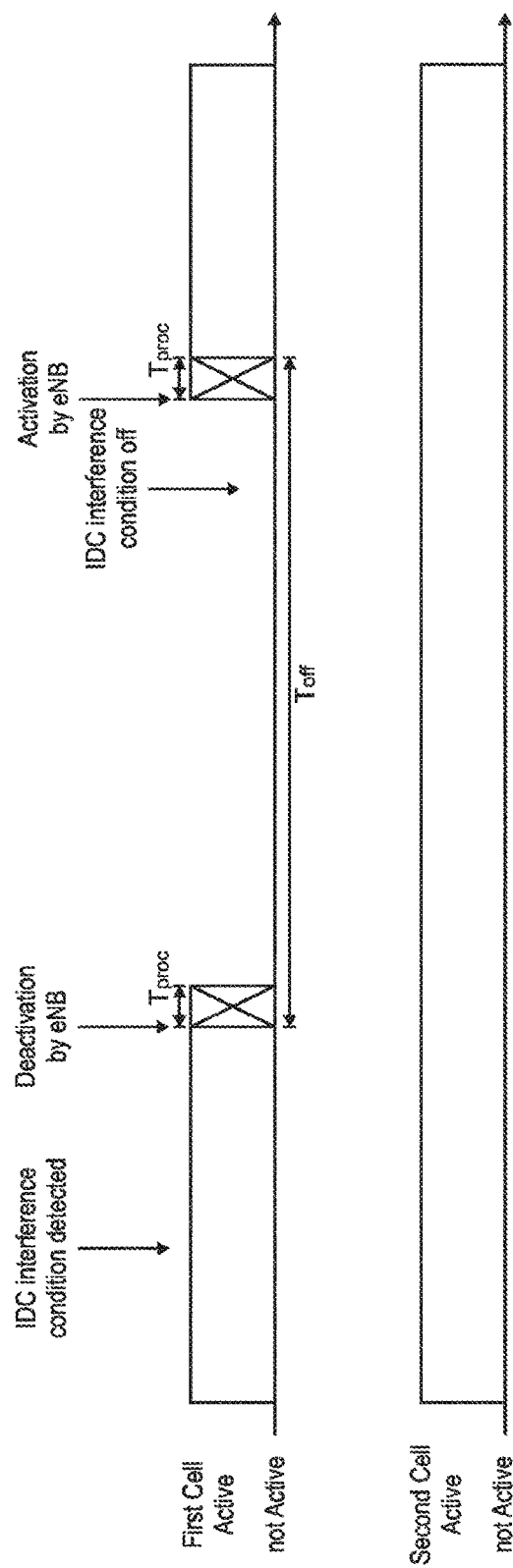
Figure 12:
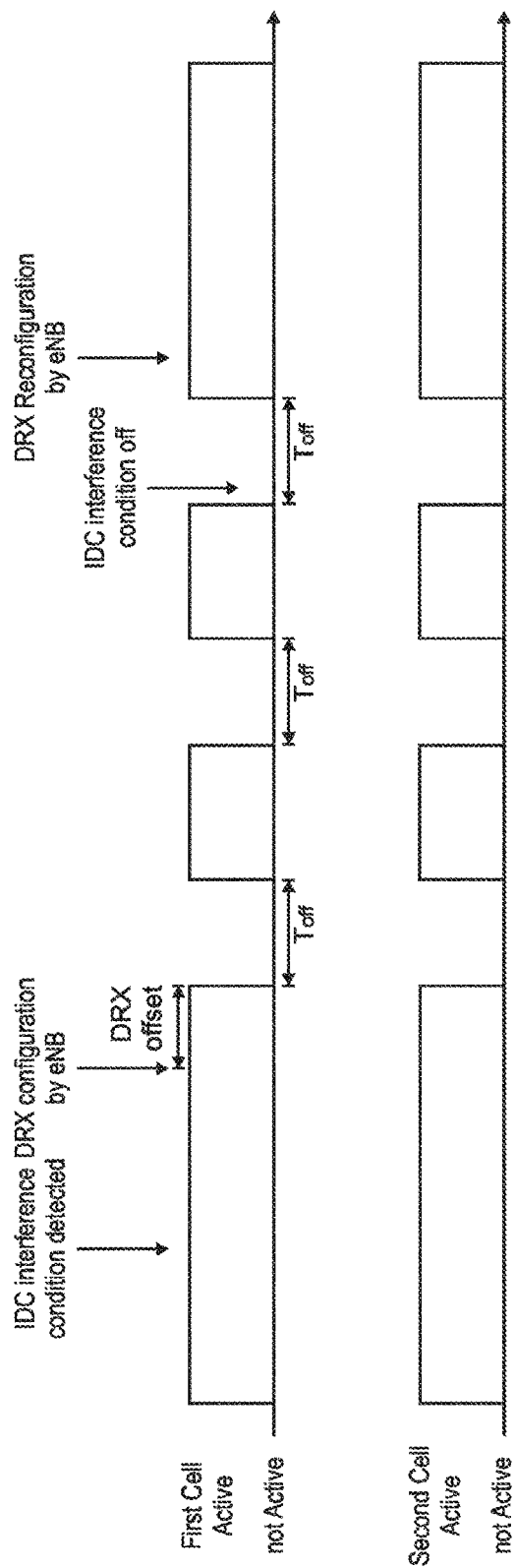

The following paragraphs will describe various embodiments of the invention. It should be noted that the invention may be advantageously used for example in a mobile communication system such as 3GPP LTE (Release 8/9) and LTE-A (Release 10/11) communication systems as described in the technical background section above, but the invention is not limited to its use in this particular exemplary communication network.

The explanations given in the technical background section above are intended to better understand the mostly 3GPP LTE (Release 8/9) and LTE-A (Release 10/11) specific exemplary embodiments described herein and should not be understood as limiting the invention to the described specific implementations of processes and functions in the mobile communication network.

The term "wireless communication device" is used in the following description to refer to any kind of device allowing for wireless communication with the mobile terminal according to the invention. In the specific in-device coexistence scenario focussed on in the invention, the "wireless communication device" may be a device enabled for communication via ISM/GSSN frequency bands. Exemplary devices can be a WIFI access point or WIFI router, a Bluetooth headset, a Bluetooth stereo system, or even a GSSN satellite.

The invention aims to provide for a maximization of scheduling opportunities of the mobile terminal (user equipment in the 3GPP context) by a base station (eNodeB or Node B in the 3GPP context) in a scenario where the mobile terminal is assumed to operate multiple in-device transceiver modules for different radio technologies in a same transmission time interval (e.g. one or more sub-frames). For this purpose, the invention separately regards in-device coexistence interference for a plurality of carriers which the mobile terminal has aggregated of different cells.

Upon the mobile terminal detecting an interference condition between one or a sub-set of the plurality of aggregated carriers and communications via the different (i.e. interfering) radio technology, the mobile terminal is to be configured to perform communication on the affected of the plurality of carrier(s) according to an activation/deactivation pattern so as to avoid in-device coexistence interference. At the same time, the mobile terminal may continue communicating on the non-affected of the plurality of cell(s).

The activation/deactivation pattern is determined for the affected of the plurality of carriers of the mobile terminal in order to mask the access pattern of the different (i.e. interfering) radio technology which has resulted in the interference condition. Configuring the mobile terminal with the activation/deactivation pattern allows the mobile terminal to deactivate and re-activate communication via the affected of the plurality of carriers at subframes avoiding the access pattern of an interfering radio technology.

A consideration underlying this invention is that an in-device coexistence, IDC, interference procedure is already specified for mobile terminals in 3GPP LTE (Release 11). There, the IDC interference procedure prescribes the mobile terminal to report an IDC interference indication for assistance to the base station in order to avoid an interference condition. This IDC interference indication includes information on interfering radio technology and an access pattern of the interfering radio technology.

However, as explained with respect to the technical background section, for the IDC interference procedure an orthogonal single-carrier uplink radio access scheme according to 3GPP LTE (Release 8/9) and LTE-A (Release 10) mobile communication system is considered. Extrapolating the specified IDC interference procedure so that it considers carrier-aggregation of multiple uplink carriers in radio communication systems according to 3GPP LTE-A (Release 10) is disadvantageous in view of undue losses of scheduling opportunities.

In other words, with the existing IDC interference procedure and even with the mechanisms discussed in the technical background section, the throughput of the mobile terminal is unduly reduced in case of an interference condition.

In this respect, an aspect of the invention is to adapt the in-device coexistence avoidance mechanism to separately consider affected and non-affected carrier(s), which a mobile terminal has aggregated. For this purpose, an activation/deactivation pattern is suggested, based on an existing IDC interference indication, which can be configured at the mobile terminal for the affected carrier(s) only. The activation/deactivation pattern allows the mobile terminal to deactivate and re-activate communication via the affected carriers at subframes avoiding the access pattern of an interfering radio technology.

Figure 16:
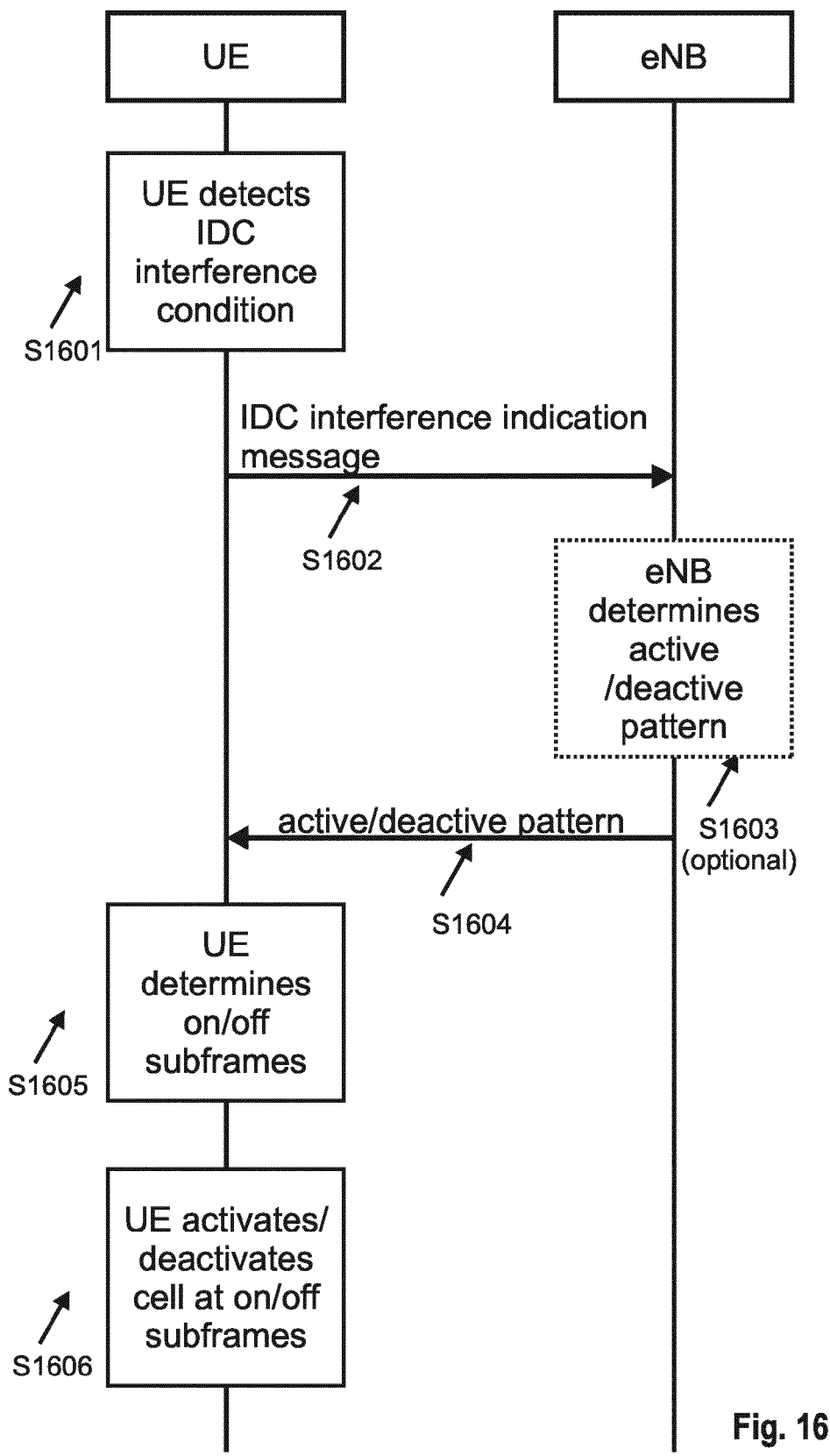
FIG. 16 shows a sequence diagram of an improved in-device coexistence interference avoiding mechanism to be performed by a user equipment (UE) according to a first embodiment of the invention.

Referring to FIG. 16, a sequence diagram of an improved in-device coexistence interference avoiding mechanism to be performed by a mobile terminal (UE) according to a first embodiment of the invention is shown. In this embodiment, it is the main idea that the mobile terminal utilizes a received activation/deactivation pattern for avoiding in-device coexistence interference on affected carriers. This behavior will be described in more detail below.

As shown in step S1601, the mobile terminal detects an in-device coexistence interference condition between communication on one or a subset of a plurality of aggregated carriers of different cells and communication with the wireless communication device. In other words, an interference condition is detected for at least one of the plurality of aggregated carriers and at least another one of the aggregated carriers is not-affected by the communication with the wireless communication device. In a scenario, with at least one affected and at least another non-affected subcarrier aggregated by the mobile terminal, all advantages of the invention can be appreciated.

Then, the mobile terminal reports, in step S1602, an in-device coexistence, IDC, interference indication for the affected of the plurality of subcarriers on which the interference condition is detected to the base station. According to one implementation, the IDC interference indication includes a desired time division multiplex, TDM, pattern indicating a periodicity of the TDM pattern and a scheduling period or an unscheduled period. Alternative implementations of the IDC interference indication are also possible such that the above implementation should not be understood as limiting the invention.

In response to the reception of the IDC interference indication from the mobile terminal, the base station determines, in step S1603, an activation/deactivation pattern for the mobile terminal to avoid on the affected carrier(s) ongoing or reoccurring interference conditions.

For this purpose, in one implementation, the activation/deactivation pattern includes an off-duration and offset. Both values, the off-duration and the offset, specify a time-period during which communication on the affected carrier(s) is to be deactivated by the mobile terminal. In detail, the offset specifies an alignment of the off-duration, i.e. when the deactivation and the successive re-activation are to be performed. The offset may be based on the reported IDC interference condition. This implementation of the activation/deactivation pattern focuses on avoiding an ongoing interference condition.

In another implementation, the activation/deactivation pattern includes an off-duration, an on-duration and an offset. All three values, namely off-duration, on-duration and offset, specify a time period during which the communication on the affected carrier(s) is to be deactivated and another time period during which the communication is to be re-activated. Also in this implementation, the offset specifies an alignment of the off-duration and the successive on-duration. Further, the mobile terminal is adapted to alternatively deactivate and re-activated communication on the affected carrier(s) such that this implementation of the activation/deactivation pattern focuses on avoiding a reoccurring interference condition.

In yet another implementation, the activation/deactivation pattern, additionally to the values described according to one of the previously described two implementations, includes ID(s) of cell(s) indicating respective carrier(s) aggregated by the mobile terminal. Specifically, the ID(s) of cell(s), included in the activation/deactivation pattern, may indicated the carrier(s) affected by the interference condition. Alternatively, the ID(s) of cell(s) may not only be restricted to carrier(s) affected by the interference condition, but, may precautionary indicate additional carrier(s) which are also likely to be affected by the interference condition. The ID(s) indicating carrier(s) of cell(s) for which the deactivation and re-activation is to be performed by the mobile terminal.

After having determined the activation/deactivation pattern, the base station transmits, in step S1604, the activation/deactivation pattern to the mobile terminal. The activation/deactivation pattern is conveyed in a new UL-DCCH Message (i.e. RRC signaling) and can also be reused to send the updated assistant information, including the case where a carrier is to be excluded from the one or subset of carriers for which communication is deactivated/re-activated by the mobile terminal according to the activation/deactivation pattern. Other signalling procedures like MAC CE can also be utilized to convey to the mobile terminal the activation/deactivation pattern.

Then, in step S1605, the mobile terminal determines, based on the received activation/deactivation pattern at least two subframes, namely a first subframe from which on communication via the affected carrier(s) is to be deactivated and a second subframe, succeeding the first subframe, from which on communication via the one of the first or second cell is to be re-activated. A determination by the mobile terminal of the two subframes corresponds to the implementation of the activation/deactivation pattern including the off-duration and the offset.

Alternatively to step S1605 and following the implementation of the activation/deactivation pattern including the three values: off-duration, on-duration and offset, the mobile terminal determines a plurality of subframes, namely a first subframe from which on communication via the affected carrier(s) is to be deactivated and a second subframe, succeeding the first subframe, from which on communication via the one of the first or second cell is to be re-activated, a third subframe, succeeding the second subframe, from which on communication via the affected carrier(s) is to be activated, etc., in order to alternatively deactivate and re-activated communication on the affected carrier(s) according to the received activation/deactivation pattern. In other words, the mobile terminal determines a plurality of subframes corresponding to start- and end-times of the time-periods during which communication on the affected carrier(s) is to be alternatively deactivated and re-activated by the mobile terminal.

Thereafter, in step S1606, the mobile terminal deactivates and re-activates the affected carrier(s) at the determined first and second subframe, respectively, for avoiding IDC interference between communication with the base station and communication with the wireless communication device. Alternatively, the mobile terminal performs, in addition to deactivating and re-activating the affected carrier(s) at the determined first and second subframe, subsequent deactivating and re-activating steps for alternatively deactivating and re-activating the affected carrier(s) at further determined subframes (i.e. including the third subframe), succeeding the second subframe.

In this respect, it can be readily appreciated that application of the activation/deactivation pattern by the mobile terminal maximizes scheduling opportunities in case of ongoing or reoccurring in-device coexistence interference. An example of reoccurring in-device coexistence interference, and the according application of the activation/deactivation pattern by the mobile terminal, is illustrated in FIG. 17.

Figure 17:
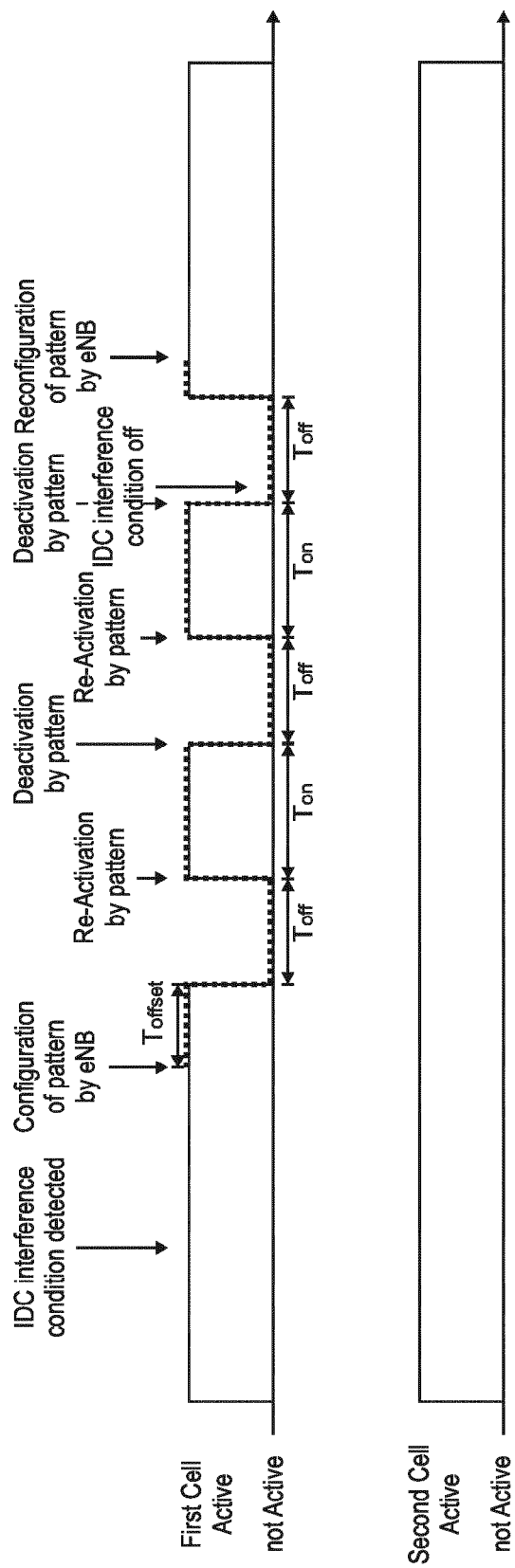
FIG. 17 illustrates application of an activation/deactivation pattern by the UE according to the first embodiment of the invention for avoiding in-device coexistence interference.

In this example, the short but repetitive type of interference with respect to communication on the first carrier of the first cell is denoted by the dashed line in FIG. 17. The previously described improved in-device coexistence interference avoiding mechanism according to the first embodiment of the invention is applied in the exemplary scenario of the invention.

As result of the reception of the activation/deactivation pattern by the mobile terminal and the determination of the first and second subframe based on the received activation/deactivation pattern, the mobile terminal is "configured" with the pattern by the base station.

The term "configured" refers, in the context of the invention, to a state of the mobile terminal in which it is provided with an activation/deactivation pattern but has not necessarily started performing deactivation and re-activation of communication on the affected carrier(s). In more detail, the offset value included in the received activation/deactivation pattern may prescribe a delay ($\Delta$Toffset) between time-point when the mobile terminal is "configured" and the time-point when the mobile terminal deactivates communication on the affected carrier(s) for the first time.

Figure 15:
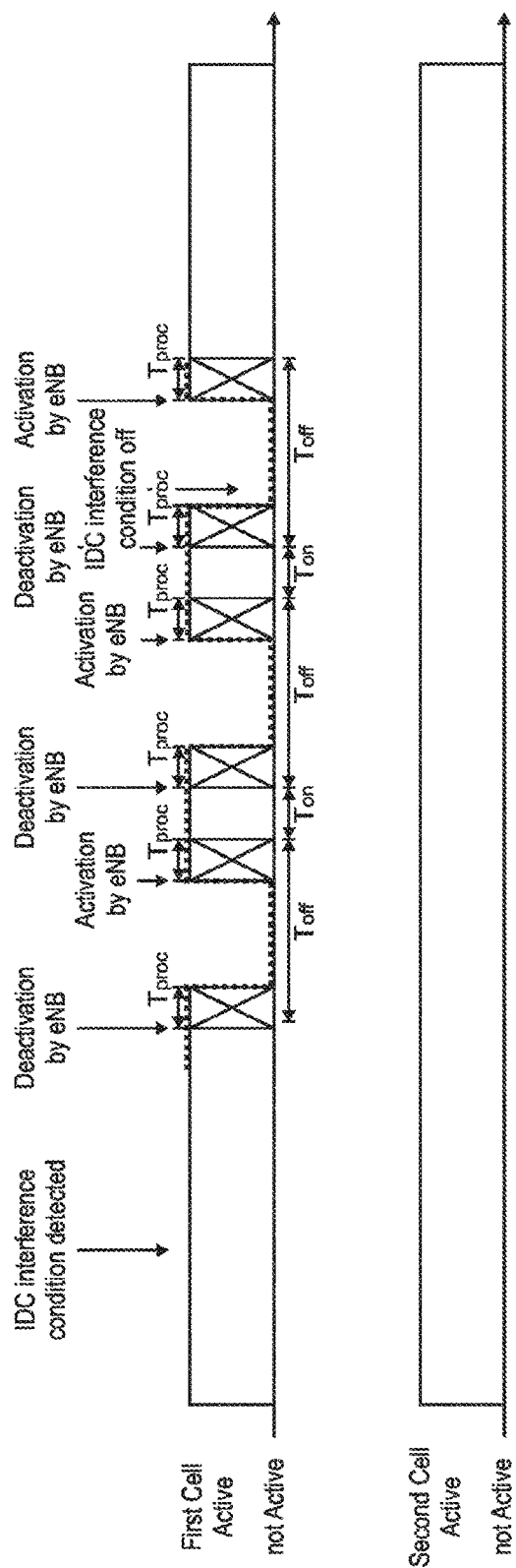

The off-duration ($\Delta$Toff) enacted (actually carried out) by the mobile terminal, i.e. the time period between the time-point when the mobile terminal deactivates and subsequently re-activates, due to the "configured" pattern, communication on the affected carrier(s), as shown in FIG. 17, corresponds to the time-period indicated by the activation/deactivation pattern during which communication on the affected carrier(s) is to be deactivated. In other words, there is no delay requirements (e.g. due to a processing of activation/deactivation commands from the base station) which forces unduly extending the off-duration actually carried out by the mobile terminal (as is, for instance, the case in the extended mechanism illustrated in FIG. 15).

Consequently, it can be readily appreciated that the improved in-device coexistence interference avoiding mechanism according to the first embodiment of the invention allows minimizing the off-duration actually carried out by the mobile terminal. In other words, the off-duration is reduced to the time-period indicated in the received activation/deactivation pattern and, thereby, scheduling opportunities are maximized for the mobile terminal.

Similarly, the on-duration i.e. scheduling opportunity ($\Delta$Ton) enacted (actually carried out) by the mobile terminal (i.e. the time period between the time-point when the mobile terminal re-activates and de-activates, due to the "configured" pattern, communication on the affected carrier(s), as shown in FIG. 17) also corresponds to the time-period indicated by the activation/deactivation pattern, i.e. in case of the second implementation of the activation/deactivation pattern. Also for the on-duration, there is no delay requirement which would result in losing on-duration time i.e. loosing scheduling opportunities for the mobile terminal.

Upon detection of the termination of the IDC interference condition, i.e. interference condition off, the mobile terminal may wait for the next activation of communication on the previously affected carrier(s), to then report on said carrier(s) to the base station an IDC interference indication that the problem is solved. The base station then reconfigures the activation/deactivation pattern to exclude at least the carrier, for which the "problem solved" IDC interference indication is reported, from deactivation/re-activation by the mobile terminal.

Alternatively, the mobile terminal may not wait for the next activation of communication on the previously affected carrier(s) but instead report on a non-affected carrier(s) to the base station an IDC interference indication that the problem is solved. In this case, the base station then reconfigures the activation/deactivation pattern to exclude at least the carrier from activation/deactivation by the mobile terminal at an earlier point in time.

According to a more detailed implementation of the activation/deactivation pattern according to the first embodiment of the invention, the following fields are included in the activation/deactivation pattern received by the mobile terminal from the base station:

LTE-on duration in subframes,
LTE-off duration in subframes,
Offset value to align the LTE-on/off periods with the pattern of the interfering radio technology, and
IDs of all carriers that shall apply the activation/deactivation pattern.

In the detailed implementation, the base station configures the mobile terminal with the above values by using for example an RRC message. After receiving the configuration, the mobile terminal derives exact subframe numbers for activation and deactivation and applies them to the identified carrier(s). The mobile terminal then periodically repeats the configured activation/deactivation pattern until the network/base station reconfigures the mobile terminal or revokes the activation/deactivation configuration.

According to the invention, the term "deactivation of a carrier" or "deactivate communication on a carrier" refers to the time-period of a mobile terminal where: no transmission of SRS is performed, no CQI/PMI/RI/PTI are reported, no UL-SCH transmission are carried out, and no monitoring of PDCCH is performed. In this respect, the mobile terminal behavior during the deactivated time-period is the same as the behavior currently defined for deactivated SCells.

Figure 18:
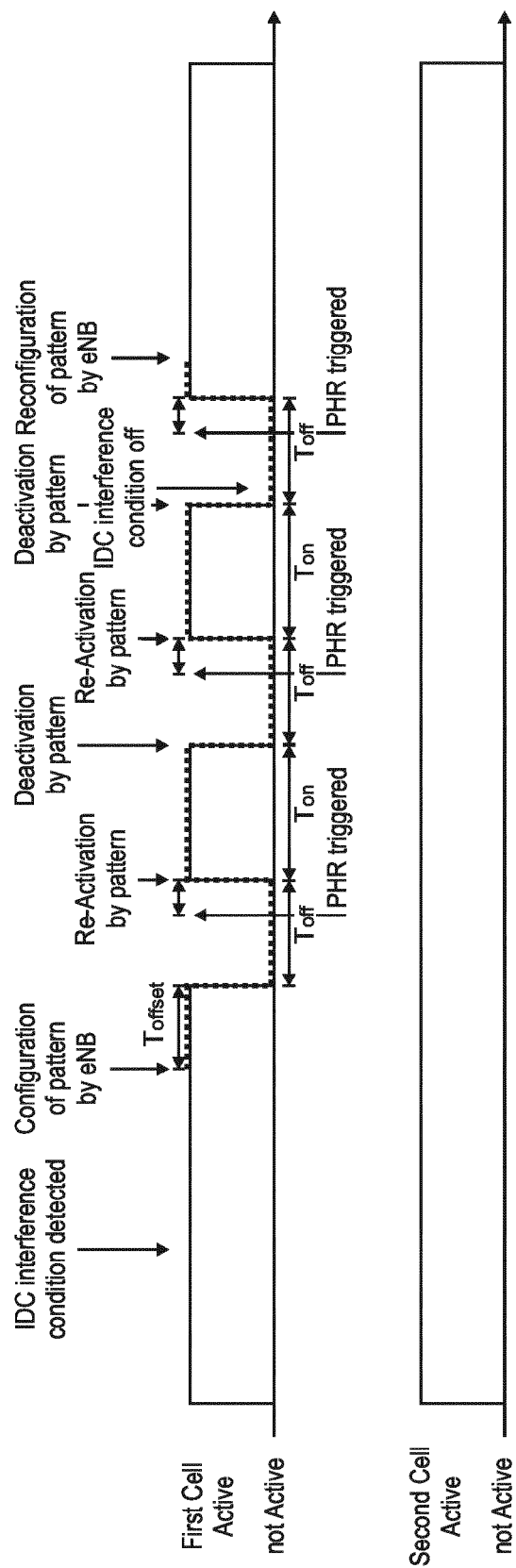
FIG. 18 illustrates application of the activation/deactivation pattern including PHR triggering by the UE according to a variation of the first embodiment of the invention.

Referring now to FIG. 18, a variation of the improved in-device coexistence interference avoiding mechanism according to the first embodiment of the invention is shown. This variation focuses on improving the scheduling decision of carrier(s) affected by an IDC interference condition by the base station for affected carriers(s) i.e. for which an IDC interference indication has been reported.

In response to the reception of the activation/deactivation pattern by the mobile terminal, the mobile terminal not only deactivates and reactivates communication on the affected carrier(s) but also triggers a power headroom report, PHR, prior to the re-activation of the affected carrier(s) of the respective cell at the determined subframe.

In other words, in response to the reception of an activation/deactivation pattern, a new or additional PHR trigger is configured based on the subframes determined for re-activation of the affected subcarrier(s). The PHR trigger triggers a power headroom report, PHR, on the respective affected carrier(s) a predefined number of subframes prior to the re-activation of communication on the cell (i.e. prior to the time-point of change from deactivated to activated state). According to an example, the predefined number of subframes is 6 subframes prior to the state change.

Thereby, it is possible for the mobile terminal to assist the bases station with a PHR that closely resembles available power headroom of the mobile terminal at the time of re-activation of communication on the affected carrier(s) of the respective cell(s). The base station (i.e. network) may or may not configure the mobile terminal to set the PHR trigger.

Another sub-aspect of the invention focuses the interrelationship between the application of the activation/deactivation pattern by the mobile terminal, as part of the improved in-device coexistence interference avoiding mechanism according to the first embodiment, and a reception of activation/deactivation commands by the mobile terminal.

Activation/deactivation commands are transmitted by a base station to a mobile terminal for commanding the activation/deactivation of indicated carrier(s) by the mobile terminal. The activation/deactivation commands are commonly transmitted in the form of MAC control elements and have been already discussed in the technical background section.

Also for a deactivation command, on the indicated carrier(s) the mobile terminal stops transmission of SRS, stops reporting of CQI/PMI/RI/PTI, stops UL-SCH transmissions, and does not monitor the PDCCH. In view of the result, an activation/deactivation command is similar to the application of the activation/deactivation pattern by the mobile terminal.

Figure 13:
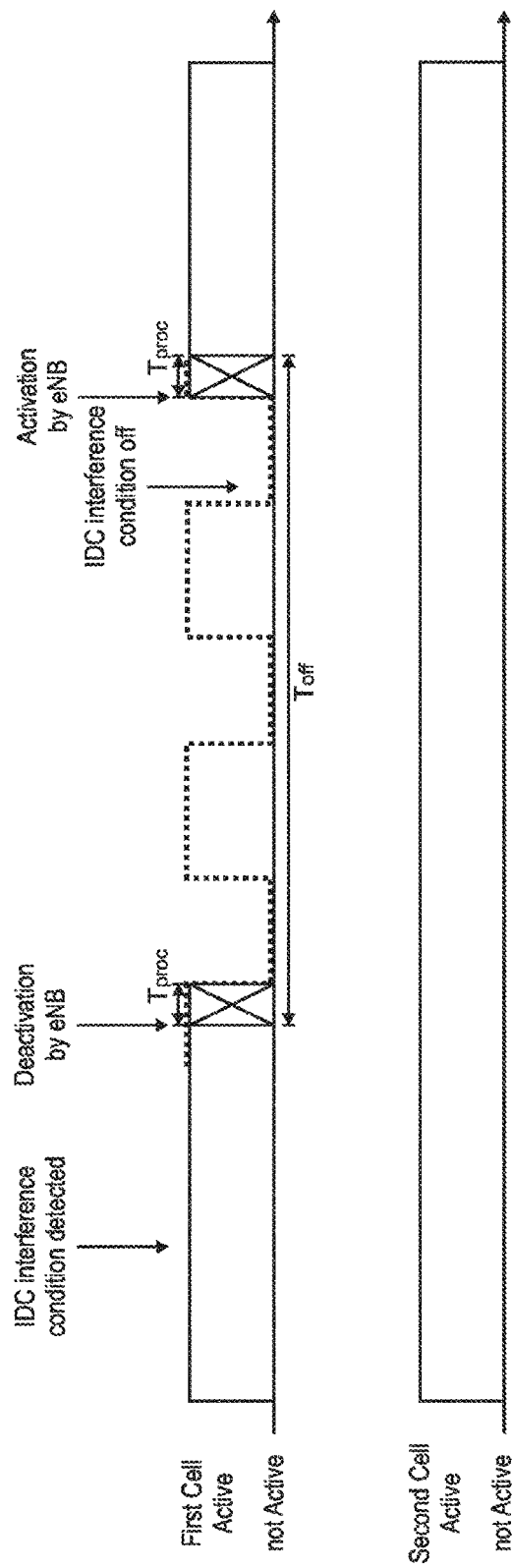
FIG. 13 illustrates lost scheduling opportunities for the application of the activation/deactivation mechanism of FIG. 11.
Figure 14:
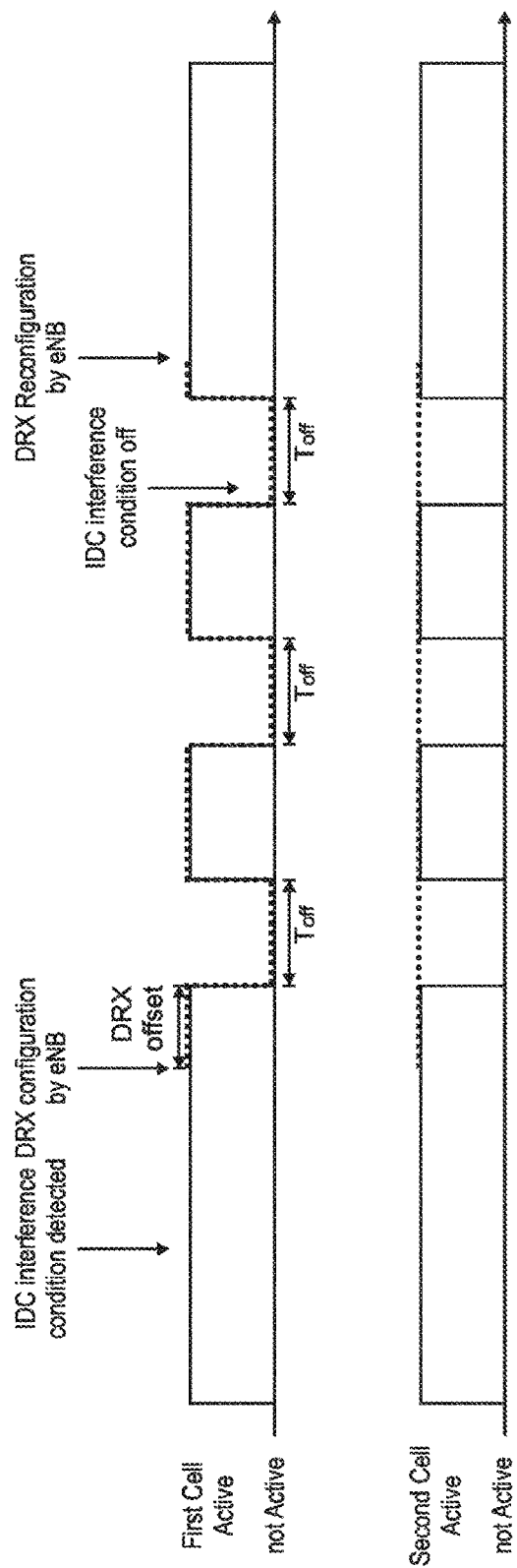
FIG. 14 illustrates lost scheduling opportunities for the application of the DRX mechanism of FIG. 12, FIG. 15 exemplifies application of an extended activation/deactivation mechanism to a carrier aggregated by a mobile terminal for avoiding Rel11 in-device coexistence interference according to a TDM solution.

At the same time, it should be readily appreciated that the activation/deactivation commands are transmitted by a base station for various reasons (e.g. power saving) and are not restricted to IDC interference conditions as is the case of application of activation/deactivation patterns. As a matter of fact, the activation/deactivation commands are disadvantageous for avoiding IDC interference conditions as has been explained in the technical background section, e.g. with respect to FIGS. 13 and 15.

However, scenarios may be possible where the application of an activation/deactivation pattern by the mobile terminal for affected carrier(s) is carried out at a same time when the base station transmits also an activation/deactivation command indicated at least one of the affected carrier(s). In this respect, the interaction, namely the precedence between the two mechanisms needs to be specified.

According to a variation of the improved in-device coexistence interference avoiding mechanism according to the first embodiment, the application of the activation/deactivation pattern takes precedence over the reception of activation/deactivation commands sent by the base station via MAC CE to the mobile terminal. Accordingly, the mobile terminal ignores for a carrier that is currently configured with an activation/deactivation pattern any activation/deactivation commands received in form of a MAC CE.

In more detail, in case the mobile terminal receives, from the base station, a medium access control, MAC, control element, ordering an activation/deactivation for the affected carrier(s) of respective cells after having received, in step S1604 of FIG. 16, the activation/deactivation pattern and after having determined, in step S1605 of FIG. 16, the first and second subframe for the affected carrier(s), the MAC control element ordering the activation/deactivation is ignored by the mobile terminal and the deactivation and re-activation, in step S1606, are performed at the determined first and second subframe, respectively.

As a consequence of the above variation, for a carrier configured with activation/deactivation pattern, the base station first needs to remove the carrier from the configured activation/deactivation pattern before it can entirely deactivate the carrier with an activation/deactivation command in form of MAC CE. Yet, activated carrier(s) may always be configured, by the base station, with an activation/deactivation pattern.

Figure 19:
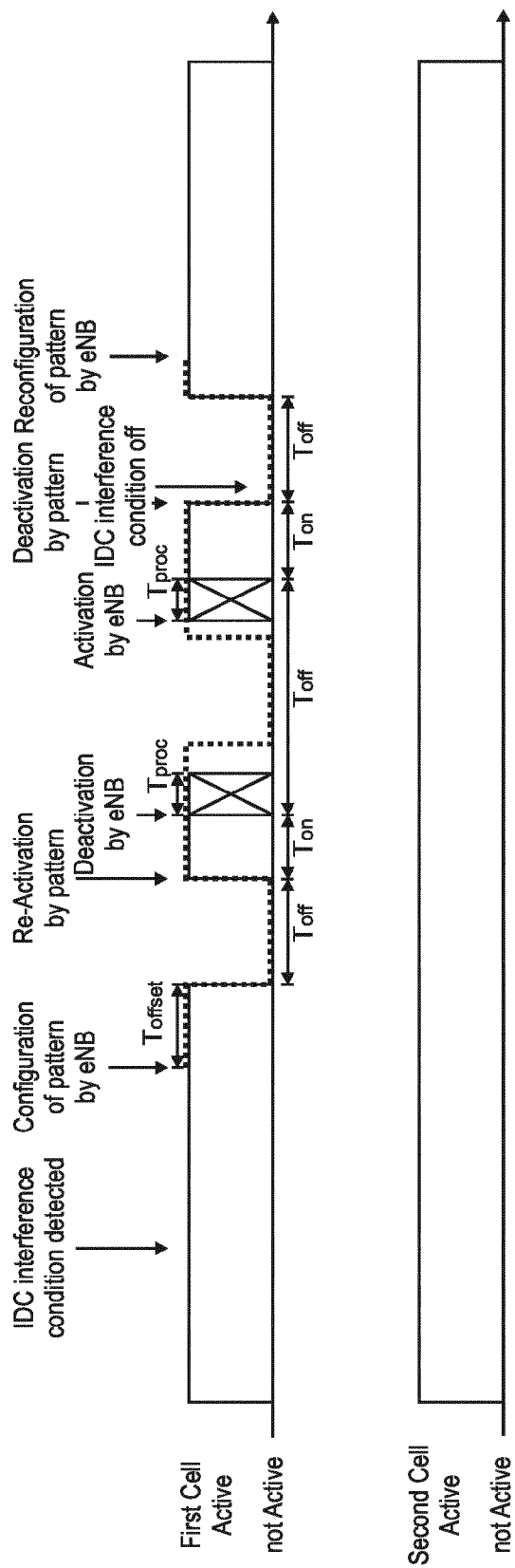
FIG. 19 illustrates application of the activation/deactivation pattern interrupted by deactivation/activation commands according to another variation of the first embodiment of the invention.

Alternatively, according to another variation of the improved in-device coexistence interference avoiding mechanism according to the first embodiment, the reception of activation/deactivation commands sent by the base station via MAC CE to the mobile terminal take precedence over the application of the activation/deactivation pattern. The application of the activation/deactivation pattern is interrupted by a deactivation/activation command according this other variation of the first embodiment is shown in FIG. 19.

In other words, the mobile terminal interrupts after reception of an activation/deactivation command indicating the deactivation of affected carrier(s) for which also an activation/deactivation pattern is configured, any re-activations and deactivations to be performed by the mobile terminal in response to the activation/deactivation pattern.

In more detail, in case of a reception, from the base station, of a medium access control, MAC, control element, ordering a deactivation of the affected carrier(s) of respective cells for which an activation/deactivation pattern has been configured, the mobile terminal deactivates communication via the affected carrier(s) after processing ($\Delta$Tproc) of the received MAC control element, and the mobile terminal resumes deactivating and re-activating at the determined subframes communication on the affected carrier(s) after a reception and after processing ($\Delta$Tproc) of another MAC control element ordering the activation of the affected carrier(s).

In case that the other received MAC control element, ordering the activation of the one of the first or second cell, is received and processed by the mobile terminal at a time for which the received activation/deactivation pattern specifies that communication on the affected carrier(s) is to be (re-)activated, the mobile terminal proceeds with (e.g. immediately) activating the communication on the affected carrier(s) after the completion of the processing of the other received MAC control element. In this respect, communication on the affected carrier(s) is deactivated by the deactivation command received from the base station until the subsequent activation by the activation command from the base station for a time-duration ($\Delta$Toff) corresponding to the time between reception of the deactivation command and reception of the activation command plus the processing delay. This case is shown in FIG. 19.

Alternatively, in case that the other received MAC control element, ordering the activation of the one of the first or second cell, is received and processed by the mobile terminal at a time for which the received activation/deactivation pattern specifies that communication on the affected carrier(s) is to be deactivated, the mobile terminal proceeds with activating the communication on the affected carrier(s), not necessarily immediately, but at a subframe for which the received activation/deactivation pattern specifies that communication on the affected carrier(s) is to be subsequently re-activated.

Consequently, in any case a mobile terminal configured with the activation/deactivation pattern for an affected carrier would start following the pattern and, only on reception of an deactivation command via MAC CE; the mobile terminal would deactivate the affected carrier on a longer time frame (i.e. not following the pattern anymore) until reception of an activation command via MAC CE for the same affected carrier.

This other variation the improved in-device coexistence interference avoiding mechanism according to the first embodiment, as illustrated in FIG. 19, provides the mobile terminal with further power saving opportunities.

Figure 20:
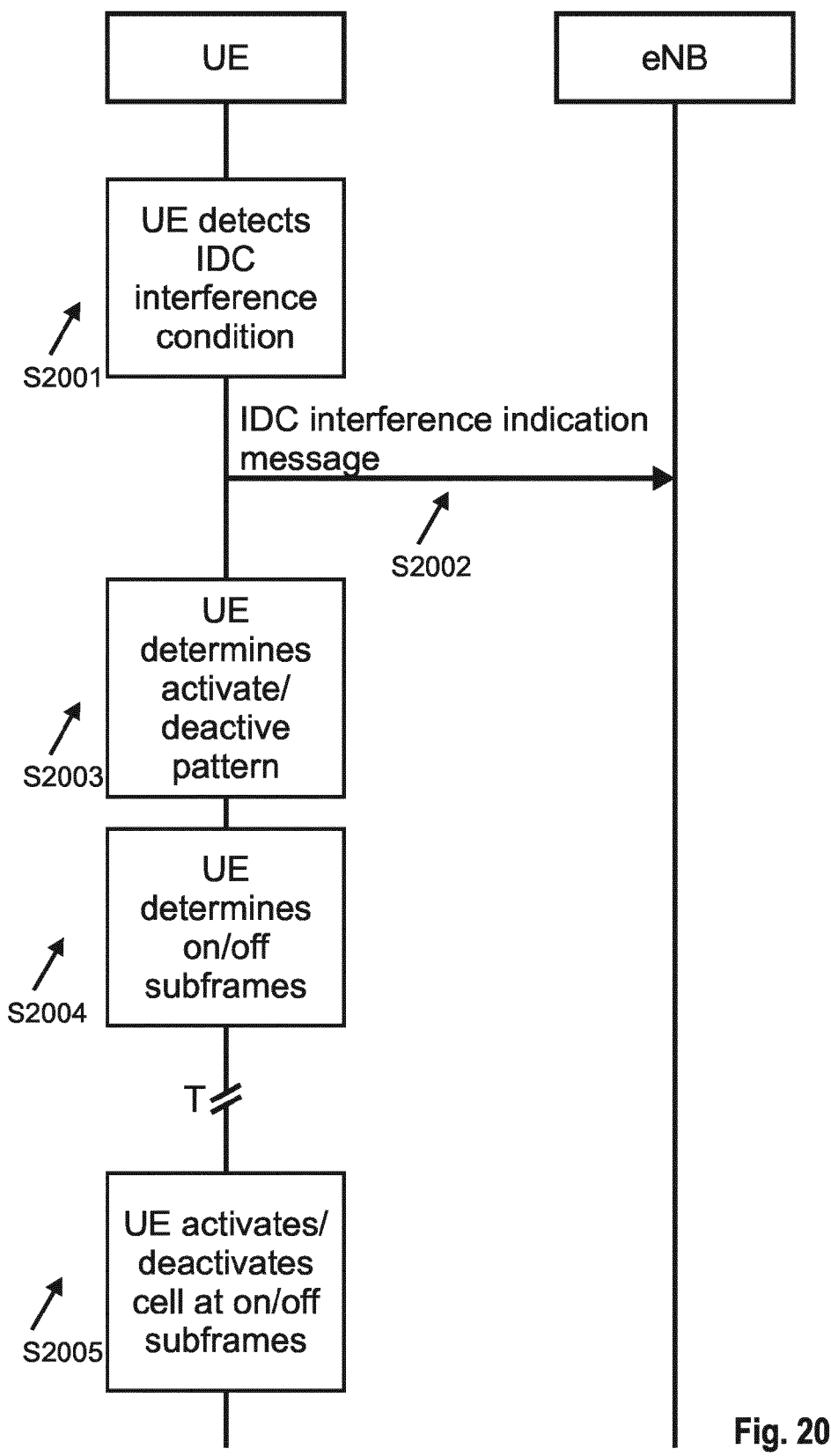
FIG. 20 shows a sequence diagram of another improved in-device coexistence interference avoiding mechanism to be performed by a user equipment (UE) according to the second embodiment of the invention.

Referring to FIG. 20, a sequence diagram of an improved in-device coexistence interference avoiding mechanism to be performed by a mobile terminal (UE) according to a second embodiment of the invention is shown. In this embodiment, it is the main idea that the mobile terminal suggests a desired activation/deactivation pattern for avoiding in-device interference on affected carriers only and autonomously applies the desired activation/deactivation pattern without approval by the base station. This behavior will be described in more detail below.

As shown in step S2001, the mobile terminal detects an in-device coexistence interference condition between communication on one or a subset of a plurality of aggregated carriers of different cells and communication with the wireless communication device. In other words, an interference condition is detected for at least one of the plurality of aggregated carriers and at least another one of the aggregated carriers is not-affected by the communication with the wireless communication device. In a scenario, with at least one affected and at least another non-affected subcarrier aggregated by the mobile terminal, all advantages of the invention can be appreciated.

Then, the mobile terminal reports, in step S2002, an in-device coexistence, IDC, interference indication for the affected of the plurality of subcarriers on which the interference condition is detected to the base station including a desired activation/deactivation pattern.

In the context of the second embodiment, it can be readily appreciated that the specified implementation of an IDC interference indication includes means to suggest a desired an on-period and/or off-period determining an activation/deactivation pattern. Specifically, the specified implementation of the IDC interference indication includes a desired time division multiplex, TDM, pattern indicating a periodicity of the TDM pattern (i.e. sum of the off-period and the on-period), and a scheduling period (i.e. on-period) or an unscheduled period (i.e. off-period). Alternative implementations of the IDC interference indication are also possible where, for instance, both, the on-period and the off-period are reported to the base station.

After reporting the IDC interference indication to the base station, the base station optionally determines, for instance in step S2304 of FIG. 23, an (other) activation/deactivation pattern for the mobile terminal to avoid on the affected carrier(s) ongoing or reoccurring interference conditions. In the second embodiment, it is important that the base station has the possibilities of determining an activation/deactivation pattern, however, the base station must not carry out the step of determining the activation/deactivation pattern for actually avoiding IDC interference conditions.

Also, after reporting the IDC interference indication to the base station, the base station determines, in step S2003, activation/deactivation pattern for the mobile terminal to avoid on the affected carrier(s) ongoing or reoccurring interference conditions.

Then, the mobile terminal determines, in step S2004, based on the determined activation/deactivation pattern at least two subframes, namely a first subframe from which on communication on the affected carrier(s) is to be deactivated and a second subframe, succeeding the first subframe, from which on communication via the one of the first or second cell is to be re-activated.

After elapse of a predetermined time-duration ($\Delta$T in FIG. 20) starting from the step of reporting the IDC interference indication, in step S2002, the mobile terminal deactivates and re-activates, in step S2005, the affected carrier(s) at least at the determined first and second subframe, respectively, for avoiding IDC interference between communication with the base station and communication with the wireless communication device. According to an example, the predetermined time duration (ΔT) amounts to 20 subframes. This time duration allows the base station to respond with a configuration message before the mobile terminal starts deactivating and re-activating, in step S2005, the affected carrier(s) at least at the determined first and second subframe, as will be described below with respect to FIG. 21 and FIG. 22.

Alternatively to step S2005, the mobile terminal after elapse of a predetermined time-duration performs, in addition to deactivating and re-activating the affected carrier(s) at the determined first and second subframe, in step S2004, subsequent deactivating and re-activating steps for alternatively deactivating and re-activating the affected carrier(s) at further determined subframes, succeeding the second subframe.

In this respect, it can be readily appreciated that autonomous application of a desired activation/deactivation pattern by the mobile terminal according to the second embodiment maximizes scheduling opportunities in case of ongoing or reoccurring in-device coexistence interference. Thereby, signalling overhead for configuring the activation/deactivation pattern is reduced.

Figure 21:
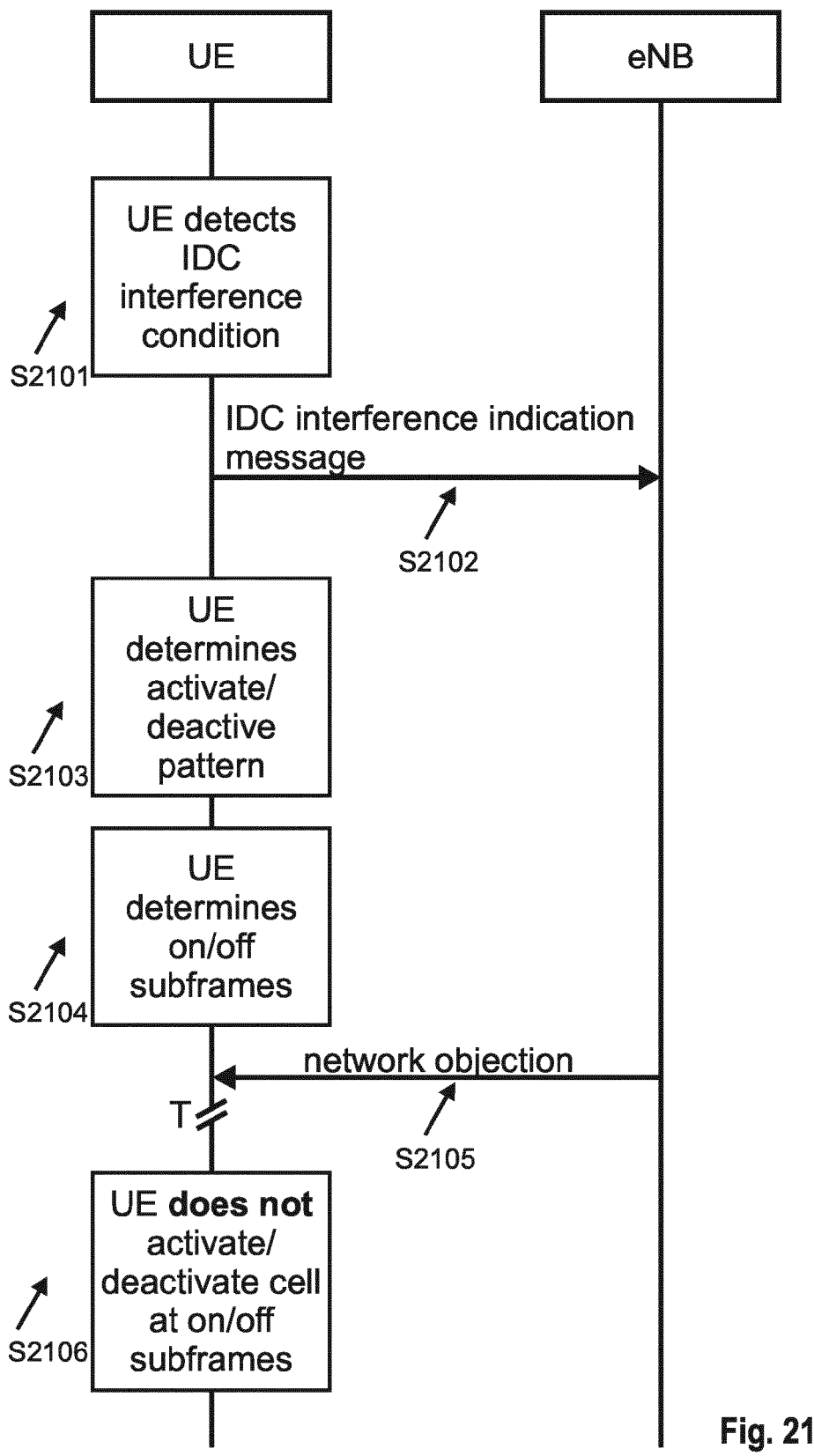
FIG. 21 shows a sequence diagram of the other improved in-device coexistence interference avoiding mechanism to be performed by a user equipment (UE) including a network objection message according to the second embodiment of the invention.

Referring now to FIG. 21, another sequence diagram of the improved in-device coexistence interference avoiding mechanism to be performed by a mobile terminal (UE) including a network objection message according to the second embodiment of the invention is shown. Specifically, the mobile terminal of FIG. 21 performs the same detection step, a same IDC interference indication reporting step, and same determination steps for the activation/deactivation pattern and for the first and second subframe described with respect to FIG. 20 such that the repetition thereof has been omitted for conciseness reasons.

In case the base station does not approve of the desired activation/deactivation pattern included in the IDC interference indication received in step S2102, the base station responds by transmitting, in step S2105, a network objection to the mobile terminal.

In case the network objection is received prior to elapse of the predetermined time duration (ΔT), the mobile terminal proceeds with not applying the desired activation/deactivation pattern, i.e. the mobile terminal does not deactivate and does not re-activate, in step S2106, the affected carrier(s) at the determined first and second subframe, respectively.

Figure 22:
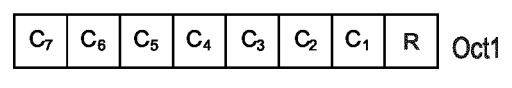

According to an implementation, the network objection is sent in form of a MAC control element where the R-bit is 1. As an exemplary implementation, the Activation/Deactivation MAC CE is used to convey the network objection information by setting the currently reserved bit (R-bit) to one as shown in FIG. 22. Alternatively, according to another implementation, the network objection is sent as an RRC message.

Referring now to FIG. 23, yet another sequence diagram of the improved in-device coexistence interference avoiding mechanism to be performed by a mobile terminal (UE) including a network objection message according to the second embodiment of the invention is shown. Specifically, the mobile terminal of FIG. 23 performs the same detection step, a same IDC interference indication reporting step, and same determination steps for the activation/deactivation pattern and for the first and second subframe described with respect to FIG. 20 such that the repetition thereof has been omitted for conciseness reasons.

In case the base station does not approve of the desired activation/deactivation pattern included in the IDC interference indication received in step S2302, the base station responds by transmitting, in step S2105, another activation/deactivation pattern for the affected carrier(s) for which the IDC interference indication is reported, the activation/deactivation pattern indicating another off-duration and another offset specifying another time-period during which communication on the affected carrier(s) is to be deactivated.

In case the other activation/deactivation pattern is received, in step S2305, prior to the elapse of the predetermined time duration (ΔT), the determining step is reconfigured to determine, in step S2305, based on the other off-duration and the other offset indicated in the received other activation/deactivation pattern, the first and second subframe and the deactivation and the re-activation step, in step S2307, is performed using the first and second subframe.

According to a variation of the improved in-device coexistence interference avoiding mechanism according to the second embodiment, the reception of activation/deactivation commands sent by the base station via MAC CE to the mobile terminal take precedence over the application of the activation/deactivation pattern. Accordingly, after applying the activation/deactivation pattern should the mobile terminal receive a deactivation/activation command in form of a MAC CE as indicated above, it will stop the autonomously applied deactivation/activation pattern. The pattern is also stopped when the mobile terminal detects that the IDC problem is over.

As can be readily appreciated from the discussion, also the improved in-device coexistence interference avoiding mechanism according to the second embodiment can be combined with the variations discussed with respect to the first embodiment, e.g. those shown in FIGS. 18 and 19 and discussed in connection therewith.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A mobile terminal comprising:
a processor which, in operation, detects an interference condition between a first communication with an aggregation access point on at least one of a first cell and a second cell and a second communication with a wireless communication device;
transmission circuitry which, in operation, reports to the aggregation access point an in-device coexistence (IDC) interference indication for at least one of the first and second cells on which the interference condition is detected; and
reception circuit which, in operation, receives from the aggregation access point an activation/deactivation pattern for at least one of the first and second cells for which the IDC interference indication is reported, the activation/deactivation pattern indicating an off-duration and an offset specifying a time-period during which the first communication on the at least one of the first and second cells is to be deactivated and indicating an identifier (ID) of the at least one of the first and second cells to be deactivated;
wherein the processor, in operation:
determines, based on the off-duration and the offset indicated in the activation/deactivation pattern, a first subframe at which the first communication on the at least one of the first and second cells identified by the ID is to be deactivated and a second subframe, which is subsequent to the first subframe and at which the first communication on the at least one of the first and second cells identified by the ID is to be re-activated; and
deactivates and re-activates the first communication on the at least one of the first and second cells identified by the ID at the first subframe and at the second subframe, respectively.

2. The mobile terminal according to claim 1, where the activation/deactivation pattern includes an ID of another cell, for which the processor, in operation, determines two subframes at which to deactivate and re-activate the first communication with the aggregation access point, respectively.

3. The mobile terminal according to claim 1, wherein the activation/deactivation pattern indicates an on-duration which, together with the off-duration and the offset, specifies a time-period during which the first communication on the at least one of the first and second cells is to be re-activated;
wherein the processor, in operation, determines, based on the on-duration, the off-duration and the offset, third and fourth subframes, subsequent to the second subframe, at which the first communication on the at least one of the first and second cells is to be deactivated and re-activated, respectively; and
wherein the processor, in operation, deactivates and re-activates the first communication on the at least one of the first and second cells at the third subframe and at the fourth subframe, respectively.

4. The mobile terminal according to claim 1, wherein, after the processor determines the first and second subframes at which to deactivate and re-activate the first communication on the at least one of the first and second cells, if the reception circuitry receives, from the aggregation access point,
a medium access control (MAC) control element that commands activation or deactivation of the at least one of the first and second cells, the processor ignores the MAC control element.

5. The mobile terminal according to claim 1, wherein,
if the reception circuitry receives, from the aggregation access point, a medium access control (MAC) control element that commands deactivation of the at least one of the first and second cells,
the processor deactivates the first communication on the at least one of the first and second cells according to the MAC control element.

6. The mobile terminal according to claim 5, wherein,
if the activation/deactivation pattern indicates an on-duration, and
if the reception circuitry receives, from the aggregation access point, another MAC control element that commands activation of the at least one of the first and second cells,
re-activates the first communication on the at least one of the first and second cells during the on-duration indicated by the activation/deactivation pattern.

7. The mobile terminal according to claim 1, wherein the processor, in operation, triggers a power headroom report prior to the re-activation of the at least one of the first and second cells at the second subframe.

8. The mobile terminal according to claim 1, wherein
if the reception circuitry receives, from the aggregation access point, a reconfigured activation/deactivation pattern which is different from the activation/deactivation pattern previously received,
the processor reconfigures deactivation and re-activation of the first communication with the aggregation access point based on the reconfigured activation/deactivation pattern.

9. The mobile terminal according to claim 1, wherein the activation/deactivation pattern is signalled from the aggregation access point to the mobile terminal as a radio resource controls (RRC) message.

10. The mobile terminal according to claim 1, wherein the offset indicated in the activation/deactivation pattern is based on the reported IDC interference indication.

11. An aggregation access point comprising:
reception circuitry which, in operation, receives, from mobile terminal having a communication with the aggregation access point on a first cell and a second cell, an in-device coexistence (IDC) interference indication for at least one of the first and second cells on which an interference condition is detected by the mobile terminal;
a processor which, in operation, determines, based on the IDC interference indication, an activation/deactivation pattern for the mobile terminal, the activation/deactivation pattern indicating an off-duration and an offset specifying a time-period during which the communication by the mobile terminal on at least one of the first and second cells is to be deactivated and indicating an identifier (ID) of the at least one of the first and second cells to be deactivated; and
transmission circuitry which, in operation, reports the activation/deactivation pattern to the mobile terminal.

12. A method for avoiding in-device coexistence (IDC) interference in a mobile terminal in a mobile communication system, the method comprising steps performed by the mobile terminal of:
detecting an interference condition between a first communication with an aggregation access point on at least one of a first cell and a second cell and a second communication with wireless communication device;

reporting, to the aggregation access point, an DC interference indication for at least one of the first and second cells on which the interference condition is detected;

receiving, from the aggregation access point, an activation/deactivation pattern for at least one of the first and second cells for which the IDC interference indication is reported, the activation/deactivation pattern indicating an off-duration and an offset specifying a time-period during which the first communication on the at least one of the first and second cells is to be deactivated and indicating an identifier (ID) of the at least one of the first and second cells to be deactivated; and determining, based on the off-duration and the offset indicated in the activation/deactivation pattern, a first subframe at which the first communication on the at least one of the first and second cells identified by the ID is to be deactivated and a second subframe, which is subsequent to the first subframe and at which the first communication on the at least one of the first and second cells identified by the ID is to be re-activated; and deactivating and re-activating the first communication on the at least one of the first and second cells identified by the ID at the first subframe and at the second subframe, respectively.

13. The method according to claim 12, where the activation/deactivation pattern includes an ID of another cell, for which the determining step and the deactivating and re-activating step are performed.

14. The method according to claim 12, wherein the activation/deactivation pattern indicates an on-duration which, together with the off-duration and the offset, specifies a time-period during which the first communication on the at least one of the first and second cells is to be re-activated;
wherein the determining step includes determining, based on the on-duration, the off-duration and the offset, third and fourth subframes, subsequent to the second subframe, at which the first communication on the at least one of the first and second cells is to be deactivated and re-activated, respectively; and
wherein the method further comprises deactivating and re-activating the first communication on the at least one of the first and second cells at the third subframe and at the fourth subframe, respectively.

15. The method according to claim 12, wherein,
after the determining step determines the first and second subframes at which to deactivate and re-activate the first communication on the at least one of the first and second cells, if a medium access control (MAC) control element that commands activation or deactivation of the at least one of the first and second cells is received from the aggregation access point,
the MAC control element is ignored.

16. The method according to claim 12, further comprising:
triggering a power headroom report (PHR) prior to the re-activation of the at least one of the first and second cells at the second subframe.

17. The method according to claim 12, wherein the activation/deactivation pattern is signalled from the aggregation access point to the mobile terminal as a radio resource control (RRC) message.

18. The method according to claim 12, wherein the offset indicated in the activation/deactivation pattern is based on the reported IDC interference indication.

19. The method according to claim 12, further comprising steps performed by the aggregation access point of:
receiving, from the mobile terminal, the IDC interference indication for the at least one of the first and second cells on which the interference condition is detected by the mobile terminal;
determining, based on the IDC interference indication, the activation/deactivation pattern for the mobile terminal; and
reporting the activation/deactivation pattern to the mobile terminal.

20. The method according to claim 12, further comprising:
if a medium access control (MAC) control element that commands deactivation of the at least one of the first and second cells is received from the aggregation access point, deactivating the first communication on the at least one of the first and second cells according to the MAC control element.

* * * * *

UNITED STATES PATENT AND TRADEMARK OFFICE
CERTIFICATE OF CORRECTION

PATENT NO.         : 9,655,160 B2
APPLICATION NO.    : 14/425308
DATED              : May 16, 2017
INVENTOR(S)        : Martin Feuersaenger et al.

It is certified that error appears in the above-identified patent and that said Letters Patent is hereby corrected as shown below:

In the Claims

Column 37, Line 1:
"reporting, to the aggregation access point, an DC interference" should read, --reporting, to the aggregation access point, an IDC interference--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*